US012568004B2

(12) United States Patent
Xavier et al.

(10) Patent No.: US 12,568,004 B2
(45) Date of Patent: Mar. 3, 2026

(54) FEED FORWARD EQUALIZERS WITH CURRENT MODE SAMPLING

(71) Applicant: Texas Instruments Incorporated, Dallas, TX (US)

(72) Inventors: Ani Xavier, Bangalore (IN); Aviral Singhal, Roorkee (IN); Jagannathan Venkataraman, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/440,797

(22) Filed: Feb. 13, 2024

(65) Prior Publication Data

US 2025/0260604 A1     Aug. 14, 2025

(51) Int. Cl.
H04L 25/03 (2006.01)

(52) U.S. Cl.
CPC .. H04L 25/03885 (2013.01); H04L 25/03057 (2013.01)

(58) Field of Classification Search
CPC .................... H04L 25/03885; H04L 25/03057
See application file for complete search history.

(56) References Cited

U.S. PATENT DOCUMENTS

| | | | | |
|---|---|---|---|---|
| 8,466,712 B1 * | 6/2013 | Avitan | ................ | H04L 25/0276 |
| | | | | 326/115 |
| 9,473,330 B1 * | 10/2016 | Francese | ........... | H04L 25/03057 |
| 9,806,915 B1 * | 10/2017 | Elzeftawi | ............. | H03G 3/3036 |
| 2013/0208779 A1 * | 8/2013 | Agrawal | ................ | H04L 27/01 |
| | | | | 375/232 |
| 2015/0085914 A1 * | 3/2015 | Kizer | ..................... | H04L 27/06 |
| | | | | 375/233 |

OTHER PUBLICATIONS

Palermo, "ECEN720: High-Speed Links Circuits and Systems Spring 2014," Lecture 8: RX FIR, CTLE, & DFE Equalization, 2014, 34 pages.

* cited by examiner

*Primary Examiner* — Freshteh N Aghdam
(74) *Attorney, Agent, or Firm* — Xianghui Huang; Frank D. Cimino

(57)     ABSTRACT

Methods, apparatus, systems, and articles of manufacture are described to perform current mode sampling with a feed forward equalizer. An example apparatus includes a transistor operable to convert an input voltage signal from a linear equalizer into a current; a first switch to enable and disable based on a first clock signal; a second switch to enable and disable based on a second clock signal; and a capacitor to: charge based on the current when the first switch is enabled; and discharge when the second switch is enabled.

21 Claims, 13 Drawing Sheets

600

FEED FORWARD EQUALIZERS WITH CURRENT MODE SAMPLING

TECHNICAL FIELD

This description relates generally to circuits, and, more particularly, to feed forward equalizers with current mode sampling.

BACKGROUND

In some systems (e.g., automotive systems), data generated and/or forwarded from a device may be received by a receiver (e.g., a retimer) and provided to a transmitter to transmit to another device. For example, a receiver can obtain sensor data and/or re-generate the data from a sensor and pass the data to processing circuitry for processing. The receiver may include circuitry (e.g., filter(s), equalizer(s), etc.) to equalize the input signal. For example, a receiver can process an input signal to reduce signal and/or channel loss, increase the amplitude of the input signal, etc. to properly recover signals transmitted from other devices.

SUMMARY

An example provided in the description includes a transistor operable to convert an input voltage signal from a linear equalizer into a current; a first switch to enable and disable based on a first clock signal; a second switch to enable and disable based on a second clock signal; and a capacitor to: charge based on the current when the first switch is enabled; and discharge when the second switch is enabled.

BRIEF DESCRIPTION OF THE DRAWINGS

The same reference numbers or other reference designators are used in the drawings to designate the same or similar (functionally and/or structurally) features.

DETAILED DESCRIPTION

Figure 1:
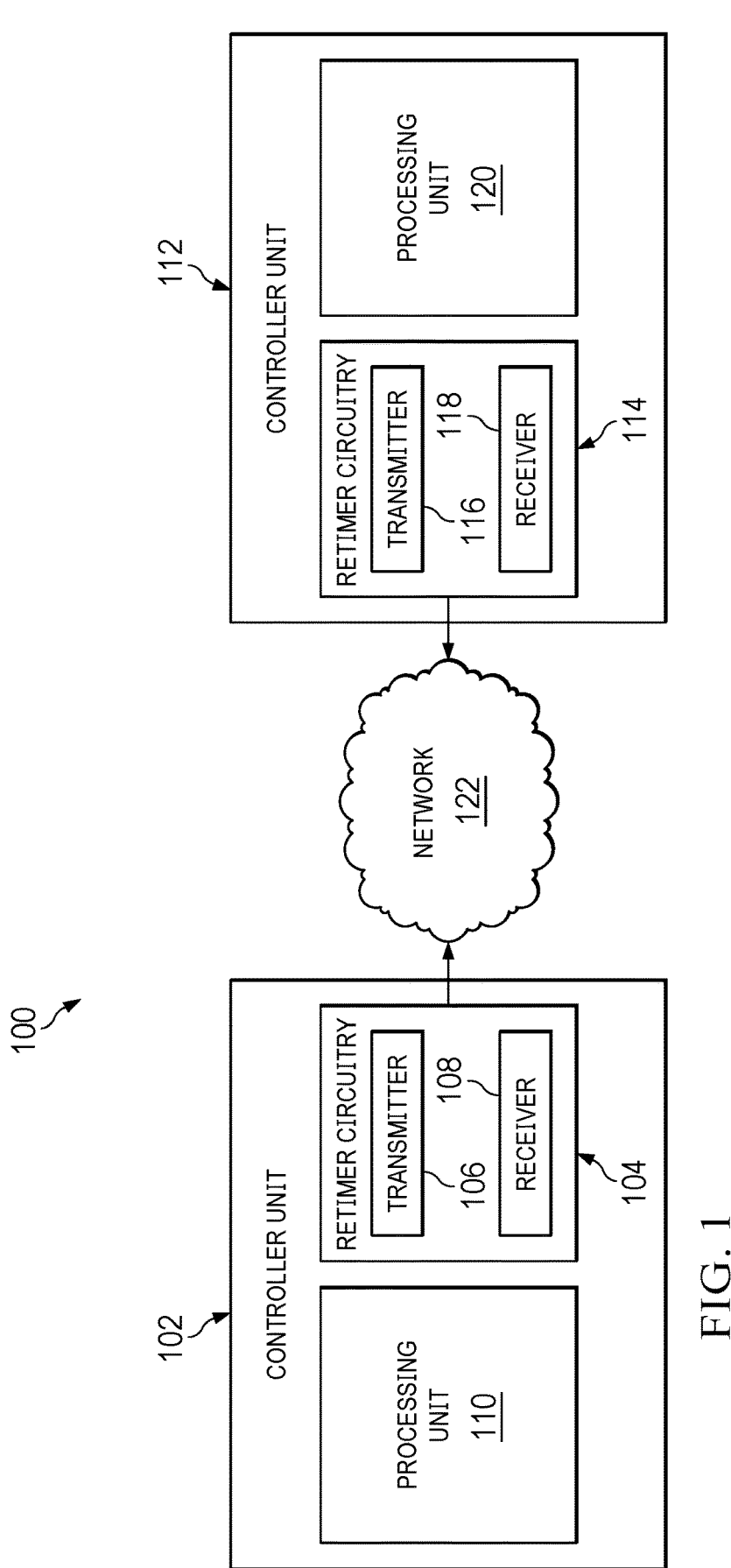
FIG. 1 is an example system to implement retimer circuitry in conjunction with examples described herein.

The drawings are not necessarily to scale. Generally, the same reference numbers in the drawing(s) and this description refer to the same or like parts. Although the drawings show regions with clean lines and boundaries, some or all of these lines and/or boundaries may be idealized. In reality, the boundaries and/or lines may be unobservable, blended and/or irregular.

In some systems, such as automotive systems, devices communicate with each other via a network connection. A network connection may include a flat panel display (FPD) link, an Ethernet connection, a wired bus, or any other wired or wireless connection. In some systems, a component of the system may include retimer circuitry. Retimer circuitry includes a receiver and a transmitter. A transmitter of one component in a system transmits data to a receiver of another component in the system via the network connection. The speed of data transmission may depend on the rate of serialization and/or de-serialization of data in the retimers.

As the rate that the serializer and/or de-serializer of retimers increases to facilitate increased transmission speed, channel loss increases at high Nyquist frequencies. Moreover, particular signaling protocols (e.g., PAM4 signaling) result in smaller signal amplitudes to increase the number of bits that can be transmitted at the same time. Accordingly, as data transmission speed increases, the more difficult it is to reconstruct obtained data and correctly determine what data was transmitted, due to signal loss and interference. Receivers implement equalization circuitry to recover data from interference after signal loss on a channel.

Equalization circuitry includes a continuous time linear equalizer and a discrete time equalizer to boost the lossy channel to reduce the effect of interference before processing the obtained data. Some discrete time equalizers include feed forward equalizers. A feed forward equalizer (FFE) (also referred to as a feed forward equalizer circuit) samples an input signal according to a sampling frequency based on a timing protocol. For example, the feed forward equalizer can sample the signal at a particular time. Also, the feed forward equalizer can sample the input signal before or after the particular point in time. As used herein, a main signal is a sample of the input signal at the particular time and a delayed, pre, and/or post signal is a sample of the input signal sampled before or after the main sample. The FFE can implement sampling circuits (e.g., taps or tap filters) to sample the signal at the various points in time. In some examples, the main signal and/or the delayed signals can be weighted. The FEE may use an algorithm (e.g., an adaptation algorithm) to determine based on characteristics of the channel where the input signal was received. The feed forward equalizer adds the delayed and potentially weighted samples of the input signal with the main sample (e.g., the weighted or unweighted main signal) of the input signal to generate an output signal that reduces the channel loss of the input signal. The output signal of a feed forward equalizer is an output voltage (Vout) that is stored in a capacitor of the feed forward equalizer.

Although some FFEs improve the processing of an obtained signal, as the sampling frequency increases, such FFEs struggle to perform effectively and/or efficiently. For example, FFEs require switches that enable and/or disable to sample an input signal in the voltage domain at different points in time. However, the higher the frequency, the switches need to be larger and more expensive to handle the higher sampling frequency. Thus, the size, resources, etc. needed to implement switches at a high frequency becomes significant. At some frequencies, switches may not be able to be controlled fast enough to keep up with the frequency of the input data due to the characteristics of the switches. Also, the clocking and distribution of input signals becomes complex leading to more components and processing resources to implement.

To implement a sample circuitry for a traditional FFEs, the sample circuit includes an input voltage that is sampled onto a capacitor by enabling a switch for a threshold amount of time. In such sample circuits, the capacitor is coupled to the switch via a resistor (Rs). In such an example, the output voltage Vout(s) (e.g., the output of the FEE) is a function of the bandwidth of the switch as shown below in Equations 1 and 2.

$$V_{out}(s) = V_{sig}(s) \times \frac{1}{1 + s(R_s C_{\infty})} \qquad \text{(Equation 1)}$$

Where Vsig(s) is bandwidth limited to $$f_s = \frac{1}{2\pi R_s C_{\infty}} \qquad \text{(Equation 2)}$$

In Equations 1 and 2, $C_{\infty}$ is the capacitance of the capacitor. The noise of the input signal as a voltage is V(n) which is wideband. The output noise Vout(n) is shown in the below Equations Equation 3-6.

$$Vout_n^2(f) = \int_0^\infty \left| \frac{1}{1 + j2\pi f R_s C_{\infty}} \right|^2 V_n^2(f) \qquad \text{(Equation 3)}$$

$$= V_n^2(f) \times \frac{1}{4 R_s C_{\infty}} \qquad \text{(Equation 4)}$$

$$= V_n^2(f) \times \frac{\pi}{2} \times \frac{1}{2\pi R_s C_{\infty}} \qquad \text{(Equation 5)}$$

$$V_{out}(t) = V_n^2(f) \times \frac{\pi}{2} \times f_s \qquad \text{(Equation 6)}$$

Thus, the bandwidth (RsCα) of a switch is designed as a per signal bandwidth (fs). Accordingly, the effective bandwidth seen by noise is $$\frac{\pi}{2} \times f_s.$$

Examples described herein achieve faster, more efficient, feed forward sampling with smaller switches, thereby consuming less area and resources than traditional techniques. For example, instead of sampling in the voltage domain, examples described herein convert the input voltage signal into a current. The current is sampled onto a capacitor instead of a voltage, which reduces overall noise at the output as further shown below in conjunction with Equations 7-12. Equations 7-12 show the output voltage as the input voltage Vin is converted to a current input (Iin) and integrated on the capacitor for a pulse time of Tp.

$$V_{out}(t) = \int_0^{Tp} Vin(t) \times gm \times \frac{dt}{C} \qquad \text{(Equation 7)}$$

$$= \int_0^\infty Vin(t) \times \frac{gm}{c} \times [u(t) - U(t - Tp] \times dt \qquad \text{(Equation 8)}$$

$$= \left[ Vin(t) \times \frac{gm}{c} \right] \otimes [U(t) - U(t - Tp)] \qquad \text{(Equation 9)}$$

$$= Vin(s) \times \frac{gm}{C} \times \left[ \frac{1}{s} - \frac{1}{s} e^{-Tps} \right] \qquad \text{(Equation 10)}$$

$$= Vin(s) \times \frac{gm}{C} \times Tp \times \frac{\sin(\pi f Tp)}{\pi f Tp} \qquad \text{(Equation 11)}$$

$$V_{out}(t) = Vin(s) \times \frac{gm}{C} \times Tp \times \text{sinc}(\pi f Tp) \qquad \text{(Equation 12)}$$

In the above Equations 7-12, gm is the transconductance of the transistor. Using Equation 12, the DC output voltage can be determined as shown in the below Equation 13 and the output voltage at the sampling frequency can be determined as shown in the below Equation $$V_{out}(DC) = Vin \times A_{DC}, \text{ where } A_{DC} = \frac{gm}{C} \times Tp \qquad \text{(Equation 13)}$$

$$V_{out}(f = 1/2Tp) = Vin \times \frac{gm}{C} \times Tp \times \frac{2}{\pi} \qquad \text{(Equation 14)}$$

Because f=½Tp is the 3 decibel (db) frequency, to increase the bandwidth, the TP needs to be reduced and reducing the gain will reduce Tp. Gm/C can be increased to compensate for the decreased gain. The noise gain corresponding to examples described herein is shown in the below Equations 15-24.

$$Vout_n^2(f) = [Vin^2(f) \times \frac{gm^2}{C^2}] \times |h(f)|^2 \qquad \text{(Equation 15)}$$

$$\text{where } h(f) - Tp \times \text{sinc}(\pi f Tp) \qquad \text{(Equation 16)}$$

$$Vout_n^2(f) = \int_0^\infty |Vout^2 n(f)| df \qquad \text{(Equation 17)}$$

$$= \frac{gm^2}{C^2} \times Vn^2 \times Tp^2 \int_0^\infty \text{sinc}(\pi f Tp) \qquad \text{(Equation 18)}$$

$$= \frac{gm^2}{C^2} \times Vn^2 \times Tp^2 \times \frac{1}{\pi Tp} \times \int_0^\infty \text{sinc}(f_1) df_1 \qquad \text{(Equation 19)}$$

$$= \frac{gm^2}{C^2} \times Vn^2 \times \frac{Tp^2}{\pi Tp} \times \left[ \frac{\pi}{2} \right] \qquad \text{(Equation 20)}$$

$$= \frac{gm^2}{C^2} \times Tp^2 \times Vn^2 \times \frac{1}{2Tp} \qquad \text{(Equation 21)}$$

$$Vout_n^2(f) = A_{DC} \times Vn^2 \times f_{3db} \qquad \text{(Equation 22)}$$

$$Vout_n^2(integ) = \times Vn^2 \times f_{3db}, \text{ if } Adc = 1 \qquad \text{(Equation 23)}$$

$$Vout_n^2(inpulse\ samp) = Vn^2 \times f_{3db} \times \frac{\pi}{2} \qquad \text{(Equation 24)}$$

Accordingly, examples described herein results in a 2/π reduction in noise at the output, due to the area of the sinc function being lower than the first order low pass filter in the corresponding frequency domain.

Examples described herein extend bandwidth of traditional discrete time equalizers by reducing the Tp pulse width. Also, the gain of the samples described herein can be adjusted by the transconductance of the transistor and/or the capacitance of the capacitor. Because sampling currents can be managed easier than sampling voltages, examples described herein can sample at higher frequencies with smaller more efficient switches. Also, examples described herein results in a 2/π reduction in output noise at the 3 db sampling bandwidth. Although examples herein are described in conjunction with retimer circuitry, examples described herein can be used in conjunction with transmitters, receivers, automotive communications, digital-to-analog and/or analog-to-digital converters, flat panel display (FPD) systems, and/or any other technology that detects a phase difference between two signals.

FIG. 1 illustrates an example system 100 for facilitating current mode sampling. The example system 100 includes example controller units 102, 112, example retimer circuitries 104, 114, example transmitters 106, 116, example receivers 108, 118, example processing units 110, 120, and an example network 122. Although the system 100 of FIG. 1 includes two controller units 102, 112 devices, there may be any number of computing devices connected via the network 122.

The controller units 102, 112 of FIG. 1 are processing devices that include the corresponding retimer circuitry 104 to communicate with each other. The controller units 102, 112 may be computers, servers, edge or cloud nodes, electrical control units, electronic control modules, and/or any other processing devices. The controller units 102, 112 may be implemented in a wired or wireless system. In some examples, the controller units 102, 112 are implemented into devices within a vehicle, as further described below in conjunction with FIG. 2.

The transmitters 106, 116 (also referred to as transmitter circuits) of the retimer circuitries 104, 114 of FIG. 1 obtain data that is to be sent to another computing device and processes the data for transmission. For example, the transmitter(s) 106, 116 may perform one or more tasks to the obtained data to satisfy a protocol (e.g., a timing protocol, a communication protocol, etc.). After the data is processed, the transmitter(s) 106, 116 transmit(s) the data according to the protocol to the other controller unit 102, 112 via the network 122.

The receivers 108, 118 of the retimer 104, 114 of FIG. 1 obtains data via the network 122 and converts and/or processes the data so that it can be processed by the processing unit 110, 120 of the corresponding controller unit 102, 112. Due to channel loss, the amplitude of the data signal that is obtained via the network 122 may be lower than the amplitude of the data signal when output by the transmitter. Accordingly, the receivers 108, 118 include equalizer circuitry to process the obtained data to recover the data in the data signal. Without equalization, the obtained data may be misclassified, thereby providing inaccurate data to the processing unit 120. As further described below, the receiver 118 includes a feed forward equalizer or an integrating sampler that equalizes the input data signal in the discrete time domain by sampling a current that corresponds to the input data signal. Sampling in the current domain, as opposed to the voltage domain, increases the bandwidth of the receiver 118, reduces the output noise, and allows for smaller, less resource intensive switches to be utilized.

The processing units 110, 120 of FIG. 1 execute instructions to perform functions and/or operations based on data communicated between the retimer circuitries 104, 114. When the processing units 110, 120 communicate with an external device, the processing units 110, 120 transmit instructions to send information and/or obtain received information from the retimer circuitry 104, 114.

The example network 122 of FIG. 1 is a system of interconnected systems exchanging data. For example, the network 122 may be a shared interface or media such as a flat panel display link, an Ethernet connection, etc. In some examples, the network 122 may represent a physical full-duplex interface that enables transmission and reception on the same connection using a single twisted pair cable. However, the network 122 may correspond to a different connection (e.g., a different wired or wireless connection).

Figure 2:
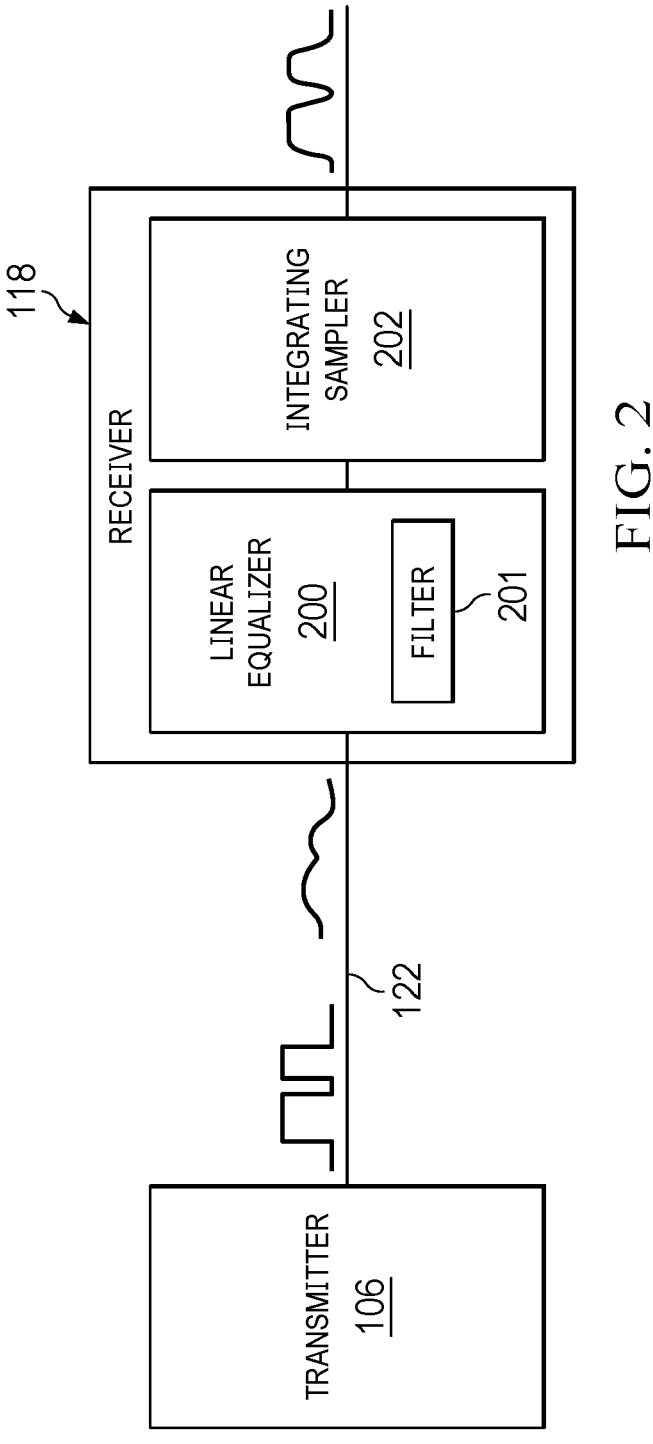
FIG. 2 illustrates a block diagram to implement the receiver of FIG. 1.

FIG. 2 is a block diagram of an example implementation of the transmitter 106 (also referred to as a transmitter circuit) and the receiver 118 (also referred to as a receiver circuit) connected via the network 122 of FIG. 1. The receiver 118 includes an example linear equalizer 200, an example filter 201, and an example integrating sampler 202. However, the receiver 118 may include additional and/or alternative components. Also, although the transmitter 106 and the receiver 118 are illustrated in FIG. 2, FIG. 2 may be described in conjunction with the receiver 108 and the transmitter 116.

As shown in the example of FIG. 2, the transmitter 106 transmits a signal to the receiver 118 via the network/channel 122. When the signal is output via the transmitter 106, the signal has distinct logic high values and logic low values. However, when the data signal is obtained by the receiver 118, the data signal has degraded due to channel loss. Accordingly, the input data signal at the receiver 118 needs to be equalized and/or reconstructed to be able to determine and/or process the data signal output by the transmitter 106.

The linear equalizer 200 of FIG. 2 (also referred to as a linear equalizer circuit) equalizes the obtained signal in the continuous time domain. The linear equalizer 200 compensates for a filtering effect of the network 122 that creates intersymbol interference. In some examples, the linear equalizer 200 includes the example finite impulse response filter 201 (also referred to as a linear transversal filter). In some examples, the linear equalizer 200 uses the filter 201 to employ an algorithm (e.g., a zero-forcing linear equalization algorithm, a mean squared error linear equalization algorithm, etc.) to reduce the effect of the intersymbol interference.

The integrating sampler 202 of FIG. 2 equalizes the input signal in the discrete time domain. As further described below, the integrating sampler 202 samples the input signal (that has been equalized by the linear equalizer 200) at different points in time and using different weights and sums the weighted samples to generate an equalized output signal. As shown in FIG. 2, the output of the integrating sampler more closely represents the data signal at the output of the transmitter 106. The integrating sampler 202 increases speed, bandwidth, and reduces resource and area by sampling currents (as opposed to voltages) that correspond to the data signal, as further described below in conjunction with FIG. 4.

Figure 3:
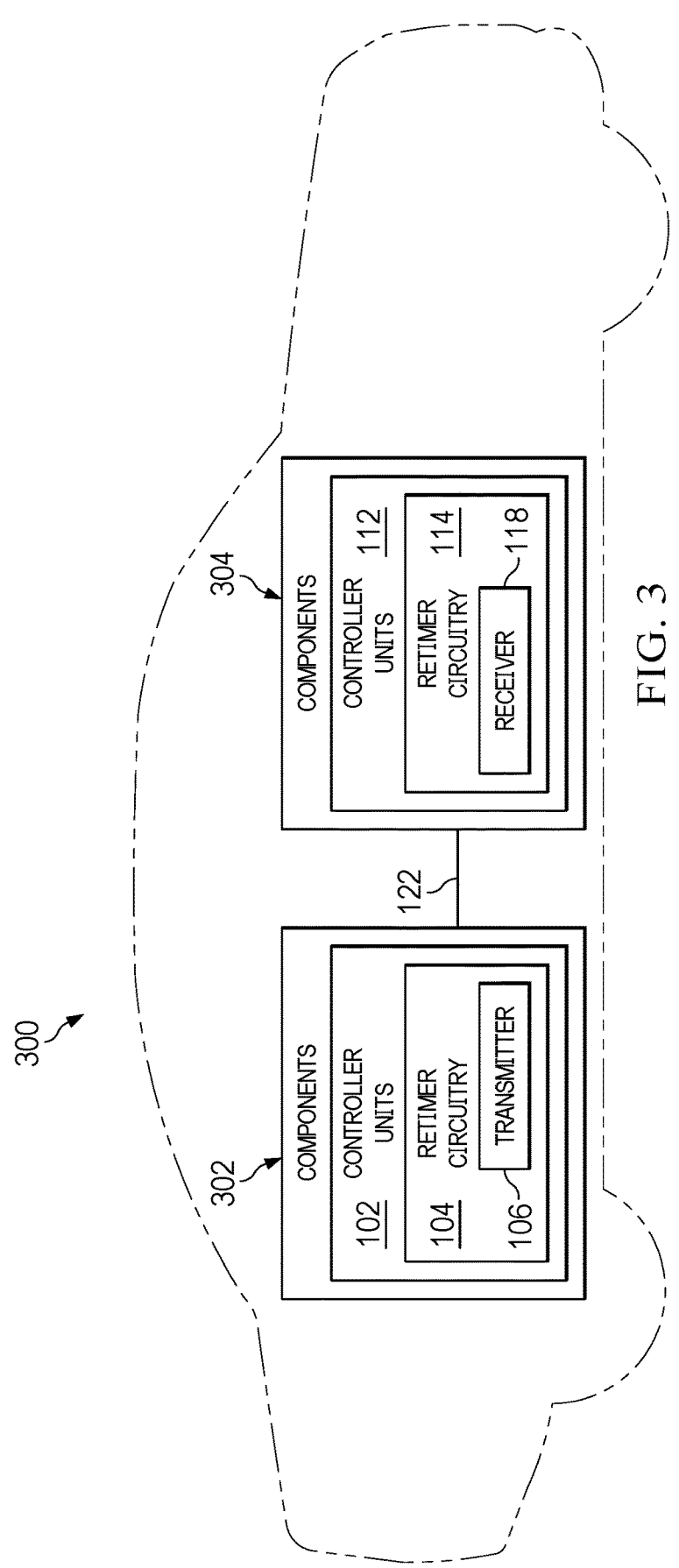
FIG. 3 is an example implementation of the retimer circuitry of FIG. 1 in a vehicle.

FIG. 3 illustrates an example vehicle 300 for implementing examples described herein. The example vehicle 300 includes components 302, 304 connected via the network 122 (e.g., an FPD link) of FIG. 1. The first component 302 includes the controller unit 102 and the transmitter 106 within the retimer circuitry 104 of FIG. 1. The first component 302 includes the controller unit 112 and the receiver 118 within the retimer circuitry 114 of FIG. 1. Although the retimer circuitry 104, 114 of FIG. 3 only include a transmitter and a receiver to describe FIG. 3, the retimer circuitry 104, 114 may each include transmitter and receiver circuitry.

In the example of FIG. 3, the first component 302 may be a camera(s), a sensor(s), a lidar system(s), a central gateway(s), etc. and the second component 304 may be a be a central computing device, an advanced driver-assistance system (ADAS), a display, an indicator, a speaker, a light, etc. However, the first component 302 and the second component 304 may be any computing device within the vehicle 300. The components 302, 304 are connected via the network 122. In the example of FIG. 3, the component 304 may obtain data from the transmitter 106 of the component 302 via the network 122. Accordingly, the receiver circuitry 118 obtains the data via the network 122 and equalizes and/or reconstructs the data signal to be processed. After the data is equalized, the processing unit 120 of the controller unit 112 can process the data and/or cause the transmitter 116 to transmit the data to another component via the network 122.

Figure 4A:
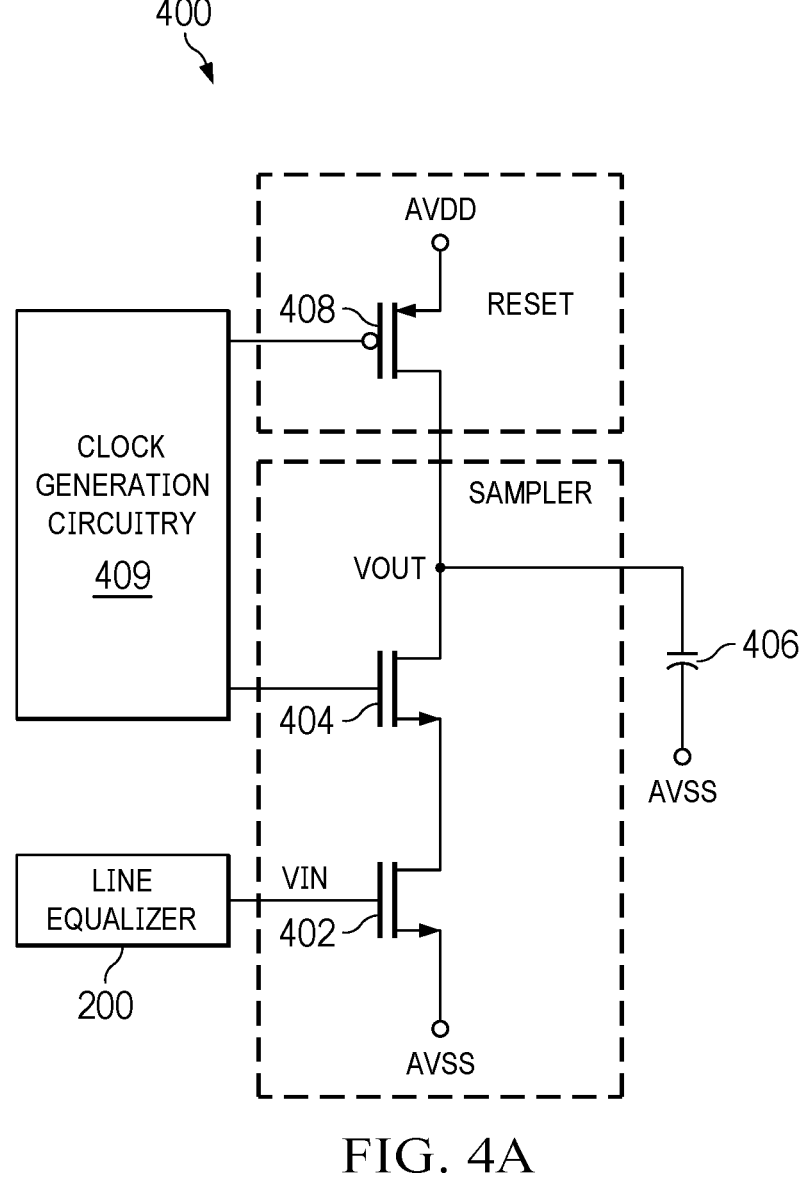
FIG. 4A is a circuit diagram of an example implementation of an integrating sampler.

FIG. 4A is a circuit implementation of an example integrating sampler 400. The integrating sampler 400 can implement the integrating sampler 202 of FIG. 2. The example integrating sampler 400 includes the linear equalizer 200 of FIG. 2 and an example transistor 402, example transistors 404, 408, an example capacitor 406, and the example clock generation circuitry 409.

The example transistor 402 of FIG. 4 converts the input voltage into a current. For example, the transistor 402 can be implemented by a metal oxide semiconductor field effect transistor (MOSFET). The transistor 402 includes a control terminal, a first current terminal, and a second current terminal. The control terminal of the transistor 402 is coupled to the output of the linear equalizer 200 of FIG. 2. The first current terminal of the transistor 402 is coupled to the second current terminal of the transistor 404. The second current terminal of the transistor 402 is coupled to a common terminal (e.g., AVSS). In some examples, the common terminal is a ground. In some examples, the common terminal is a supply voltage terminal. The example transistor 402 enables when the input signal at the control terminal is a first voltage (e.g., a low voltage or logic '0') and disables when the input signal at the control terminal is a second voltage (e.g., a high voltage or logic '1'). As used herein, the transistor 402 being enabled causes the transistor 402 to act as a closed switch to allow current to flow to/from the first current terminal from/to the second current terminal. The transistor 402 being disabled causes the transistor 402 to act as an open switch to prevent current from flowing to/from the first current terminal from/to the second current terminal. Although the transistor 402 of FIG. 4A is implemented by a transistor, the transistor 402 can be implemented by any component that converts voltage to a current.

The transistor 404 of FIG. 4A operates as a switch to allow the current from the transistor 402 to charge and/or discharge the capacitor 406 when the transistor 404 is enabled. The transistor 404 includes a control terminal, a first current terminal, and a second current terminal. The control terminal of the transistor 404 is coupled to the output of the clock generation circuitry 409. The first current terminal of the transistor 404 is coupled to the first terminal of the capacitor 406 and the second current terminal of the transistor 408. The second current terminal of the transistor 404 is coupled to the first current terminal of the transistor 402. When the transistor 404 is enabled, the current generated by the transistor 402 can be used to charge or discharge the capacitor 406 (e.g., depending on the direction of flow of the current). When the transistor 404 is disabled, the transistor 402 is decoupled from the capacitor 406 so that the current generated by the transistor 402 is not used to charge or discharge the capacitor 406. As used herein, the transistor 404 being enabled causes the transistor 404 to act as a closed switch to allow current to flow to/from the first current terminal from/to the second current terminal. The transistor 404 being disabled causes the transistor 404 to act as an open switch to prevent current from flowing to/from the first current terminal from/to the second current terminal. The transistor 404 is enabled and disabled based on an output signal (e.g., a pulse signal) of the clock generation circuitry 409. Accordingly, the clock generation circuitry 409 controls when the transistor 404 is enabled and/or disabled, as further described below in conjunction with FIG. 4B. In some examples, the transistor 404 can be replaced with any type of switching component.

The capacitor 406 of FIG. 4A stores a charge based on the current generated by the transistor 402. The stored charge corresponds to the output voltage representative of the input data signal. The capacitor 406 includes a first terminal and a second terminal. The first terminal of the capacitor 406 is coupled to the second current terminal of the transistor 408, the first current terminal of the transistor 404, and an input terminal of the processing units 110, 120 of FIG. 1. The second terminal of the capacitor 406 is coupled to a common terminal (e.g., the AVSS terminal). As described above, the AVSS common terminal may be ground or a supply voltage. The capacitor 400 charges and/or discharges based on a current flowing to/from the transistor 402 based the transistor 404 being enabled and charges and/or discharges based on the current flowing to/from the reset transistor 408 based on the reset transistor 408 being enabled. For example, if the AVDD is a supply voltage and the AVSS terminal is ground, the reset transistor 408 can be enabled to charge the capacitor 406 using the supply voltage. After the capacitor 406 is reset to a charged state, the transistor 404 can be enabled to allow a current via the transistor 402 (e.g., from the first current terminal to the second current terminal) to the AVSS terminal, thereby discharging the capacitor 406 (and lowering the output voltage) based on the input signal until the transistor 404 is disabled. In another example, if the AVDD is ground, and the AVSS is a supply voltage, the reset transistor 408 can be enabled to discharge the capacitor 406 toward ground. After the capacitor 406 is reset to a discharged state, the transistor 404 can be enabled to allow a current from the AVSS terminal via the transistor 402 (from the second current terminal to the first current terminal) to charge the capacitor 406, thereby increasing the output voltage based on the input signal until the transistor 404 is disabled. The voltage at the first terminal of the capacitor 406 corresponds to the output signal of the integrating sampler 202 that is provided to the processing unit 120.

The transistor 408 of FIG. 4A is a reset transistor to reset the charge of the capacitor 406 to a predefined amount (e.g., corresponding to the supply voltage or ground) based on being enabled prior to the transistor 404 being enabled. The transistor 408 includes a control terminal, a first current terminal, and a second current terminal. The control terminal of the transistor 408 is coupled to the clock generation circuitry 409. The first current terminal is coupled to a common terminal (e.g., AVDD). The AVDD common terminal may be a supply voltage terminal or ground. The AVDD common terminal is different than the AVSS terminal (e.g., one is ground, and the other is a supply voltage terminal). When the transistor 408 is enabled (e.g., based on the output of the clock generation circuitry 409), the transistor 408 acts as a closed switch to provide a path from the AVDD node to the capacitor 406 to charge or discharge the capacitor 406. When the transistor 408 is disabled (e.g., based on the output of the clock generation circuitry 409), the transistor 408 acts as an open switch, thereby decoupling the capacitor 406 from the AVDD terminal via the transistor 408.

The clock generation circuitry 409 of FIG. 4A (also referred to as a clock circuit) generates clock pulse signals to enable the example transistors 404, 408. The clock generation circuitry 409 includes two output terminals. The first output terminal of the clock generation circuitry 409 is coupled to the control terminal of the transistor 404. The second output terminal of the clock generation circuitry 409 is coupled to the control terminal of the transistor 408. The clock generation circuitry 409 outputs a first clock signal with a pulse to enable the reset transistor 408 followed by a second clock signal with a pulse after the pulse of the first clock signal to enable the transistor 404, as further described below in conjunction with the FIG. 4B. In some examples, instead of outputting two different signals, the clock generation circuitry 409 can output a single signal and a buffer or delay circuitry can be used to generate a second delayed signal so that the transistor 404 is enabled after the reset transistor 408 is enabled.

Although FIG. 4A illustrates a single integrating sampler 400, in some examples, the integrating sampler 202 of FIG. 2 includes two feed forward circuits. For example, if the obtained data is differential (e.g., including a first data signal Vp and a second data signal Vm that is differential to the first data signal), there may be a first feed forward circuit for sampling the Vm signal and a second feed forward circuit for sampling the Vp signal, where the average voltage of Vm and Vp at any point in time is the common mode voltage.

Using the integrating sampler 400 of FIG. 4A, input dependent current is sink during the sampling phase, which provides power savings. The common mode voltage and voltage differential for the integrating sampler 400 corresponds to the below-Equations 25 and 26.

$$V_{CM} = V_{DD} - \frac{I_{CM} * T_{samp}}{C_L} \quad \text{(Equation 25)}$$

$$V_{Diff} = \frac{g_m * v_{in} * T_{samp}}{C_L} \quad \text{(Equation 26)}$$

In the above-Equations 25 and 26, VCM is the common mode voltage, VDD is the supply voltage, ICM is the common mode current, Tsamp is the sampling rate, CL is the capacitance of the capacitor 406, gm is the transconductance of the transistor 402 (e.g., which is a function of the square root of the current through the transistor 402), and Vin is the voltage of the input data signal. In some examples, the integrating sampler 400 may have non-linearity with respect to the differential inputs/outputs and/or bandwidth issues. Accordingly, as further described below in conjunction with FIGS. 5 and/or 6, circuitry can be added to control the common mode voltage to reduce the linearity and/or bandwidth issues.

Figure 4B:
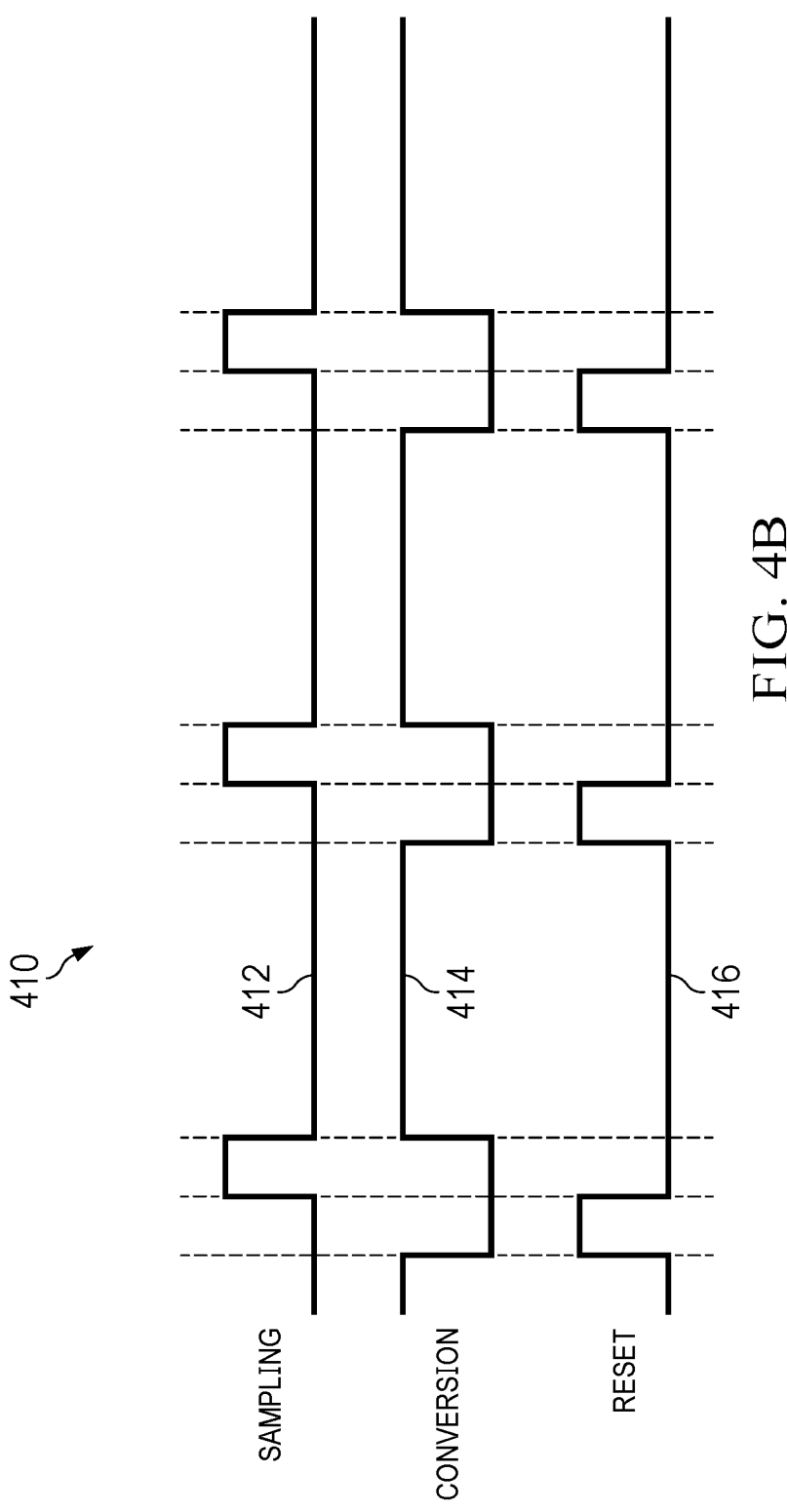
FIG. 4B is an example timing diagram described in conjunction with the integrating sampler of FIG. 4A.

FIG. 4B illustrates an example timing diagram 410. The timing diagram 410 includes the sampling signal 412, the conversion signal 414, and the reset signal 416. The sampling signal 412 corresponds to the clock signal output by the clock generation circuitry 409 to the control terminal of the transistor 404. The reset signal 416 corresponds to the clock signal output by the clock generation circuitry 409 of the control terminal of the transistor 408.

In the example of FIG. 4B, when the reset signal 416 is a first voltage (e.g., a logic high voltage) and the sampling signal 412 is a second voltage (e.g., a logic low voltage), the transistor 404 is disabled and the transistor 408 is enabled. Thus, the capacitor 406 can charge or discharge to a reset voltage (e.g., ground or the supply voltage) using the voltage from the AVDD terminal via the enabled transistor 408. Responsive to the reset signal 416 dropping to the second voltage and the sampling signal 412 increasing to the first voltage, the transistor 404 becomes enabled and the transistor 408 becomes disabled. Thus, the capacitor 406 can charge or discharge using the current drawn by the transistor 402 (e.g., which is based on the input voltage). Responsive to the sampling signal 412 dropping to the second voltage, both transistors 404, 408 are disabled and the charge stored in the capacitor 406 is held at the output terminal so that the processor unit 110, 120 can process the output signal (e.g., corresponding to the conversion signal 414 being a logic high).

Figure 5:
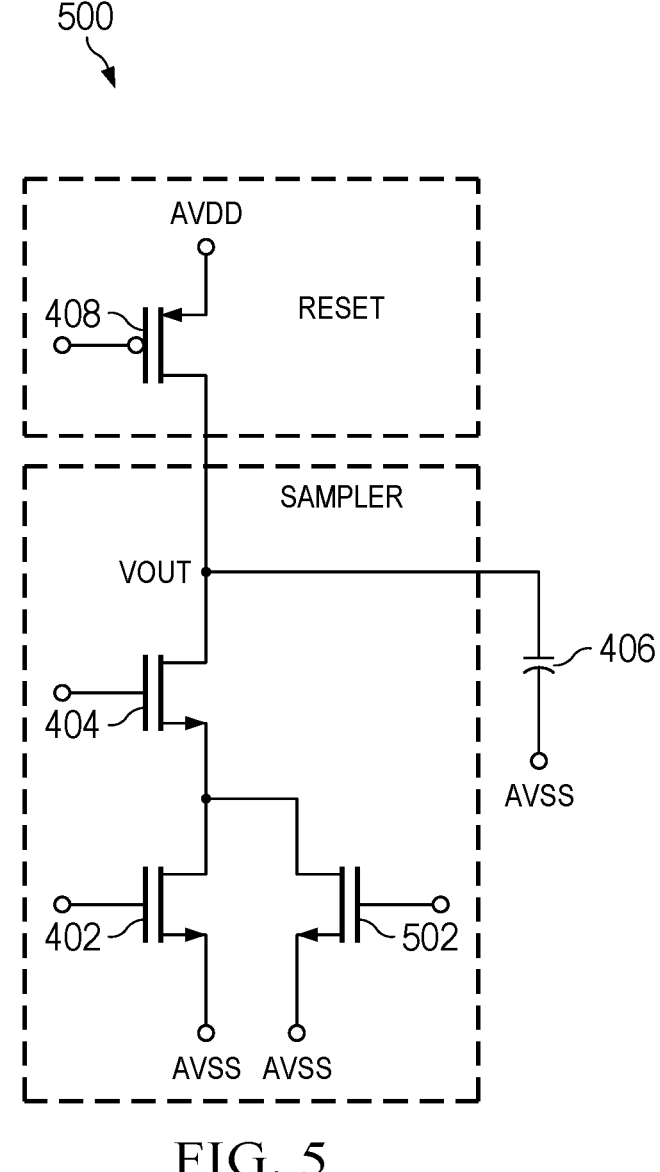
FIG. 5 is a circuit diagram of the example implementation of an integrating sampler including common mode control circuitry.

FIG. 5 is a circuit implementation of an example integrating sampler 500. The integrating sampler 500 can implement the integrating sampler 202 of FIG. 2. The example integrating sampler 500 includes the example transistor 402, the example transistors 404, 408, and the example capacitor 406 of FIG. 4. FIG. 5 further includes an example transistor 502.

The transistor 502 of FIG. 5 operates as a common mode current or voltage mitigation circuit. The transistor 502 includes a control terminal, a first current terminal, and a second current terminal. The control terminal of the transistor 502 is coupled to a bias circuit. The first current terminal of the transistor 502 is coupled to the first current terminal of the transistor 402 and the second current terminal of the transistor 404. The second current terminal of the transistor 502 is coupled to a common terminal (e.g., the AVSS terminal). The control terminal of the transistor 502 is driven using a bias voltage from the bias circuit to adjust the common mode voltage corresponding to the integrating sampler 500 to an intended voltage. Thus, the transistor 502 corresponds to an auxiliary arm that applied a gain (e.g., pulls and/or adds a constant current) while sampling to control the common mode voltage. Accordingly, the transistor 502 mitigates and/or reduces non-linearity between the differential samples by controlling the common mode current/voltage. The common mode voltage is represented by the below Equation 27.

$$V_{CM} = V_{DD} - \frac{(I_{CM} + I_{AUX}) * T_{samp}}{C_L} \quad \text{(Equation 27)}$$

The above-Equation 27, VDD is the supply voltage, Icm is the common mode current, Iaux is the current drawn by the transistor 502, Tsamp is the sampling rate, and Cl is the capacitance of the capacitor 406.

Figure 6A:
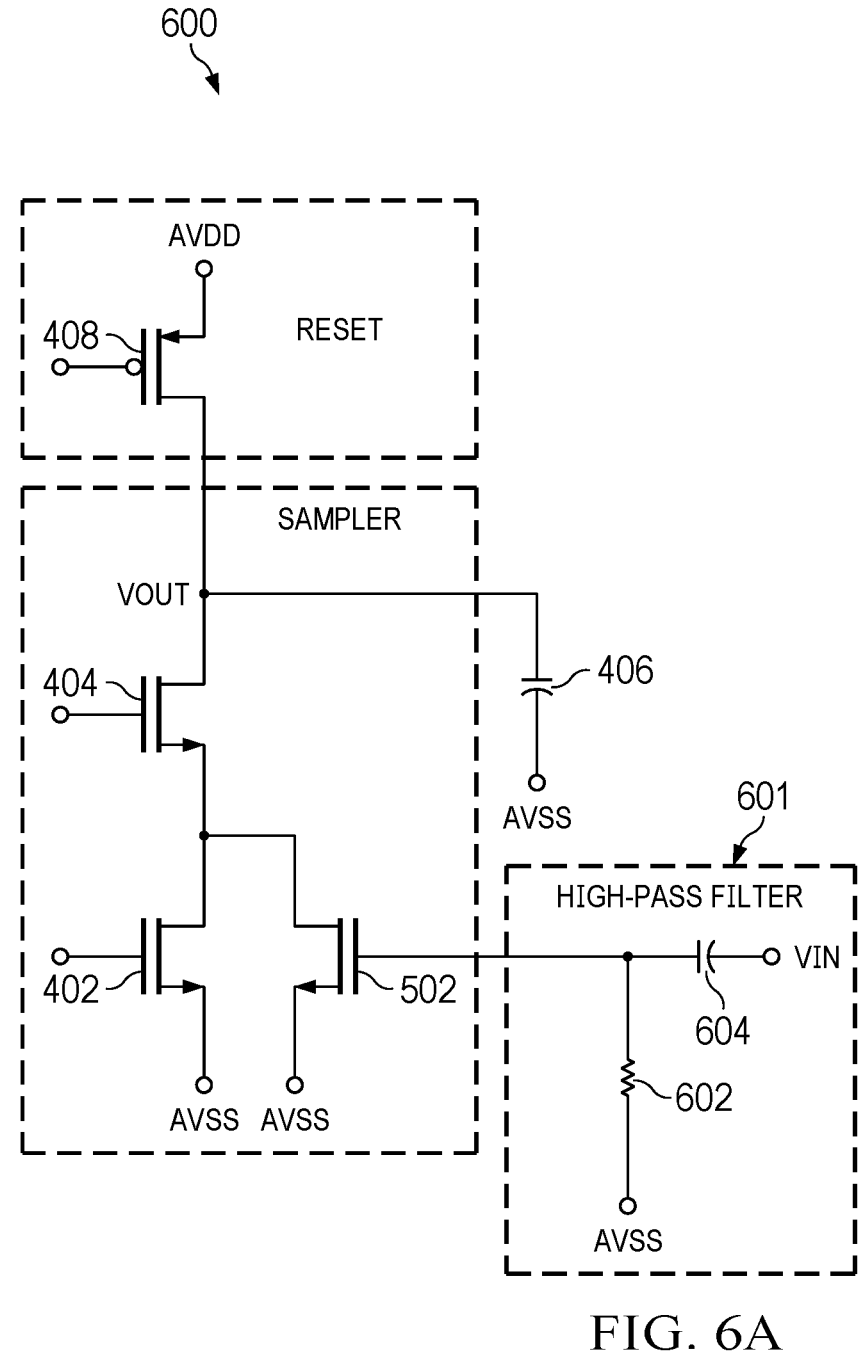
FIG. 6A is a circuit diagram of the example implementation of an integrating sampler including a high-pass filter.

FIG. 6A is a circuit implementation of an example integrating sampler 600. The integrating sampler 600 can implement the integrating sampler 202 of FIG. 2. The example integrating sampler 600 includes the example transistor 402, the example transistors 404, 408, and the example capacitor 406 of FIG. 4A and the example transistor 502 of FIG. 5. The integrating sampler 600 further includes an example high-pass filter 601. The high-pass filter 601 includes an example resistor 602 and an example capacitor 604.

The high-pass filter 601 of FIG. 6A repurposes the auxiliary path of the integrating sampler 500 of FIG. 5 to increase the bandwidth of the integrating sampler. The high-pass filter 601 includes a first input terminal, a second input terminal, and an output terminal. The first input terminal of the high-pass filter 601 is coupled with the output terminal of the linear equalizer 200. The second input terminal of the high-pass filter 601 is coupled to the bias circuitry described above in conjunction with FIG. 5. The output terminal of the high-pass filter 601 is coupled to the control terminal of the transistor 502. As described above, the output voltage associated with current sampling relates to a sinc function. Bandwidth of a feed forward circuit is limited due to the sinc roll-off/droop. However, the high-pass filter 601 compensates for the sinc roll-off/droop due to sampling to increase the bandwidth of the integrating sampler 600, as further described below in conjunction with FIG. 6B.

The high-pass filter 601 of FIG. 6A includes the resistor 602 and the capacitor 604. The resistor 602 includes a first terminal and a second terminal. The first terminal of the resistor 602 is coupled to the control terminal of the transistor 502 and the second terminal of the capacitor 604. The second terminal of the resistor 602 is coupled to the bias circuitry described above in conjunction with FIGS. 5 and/or 6A. The capacitor 604 includes a first terminal and a second terminal. The first terminal of the capacitor 604 is coupled to output terminal of the linear equalizer 200. The second terminal of the capacitor 604 is coupled to the control terminal of the transistor 502 and the first terminal of the resistor 602.

Figure 6B:
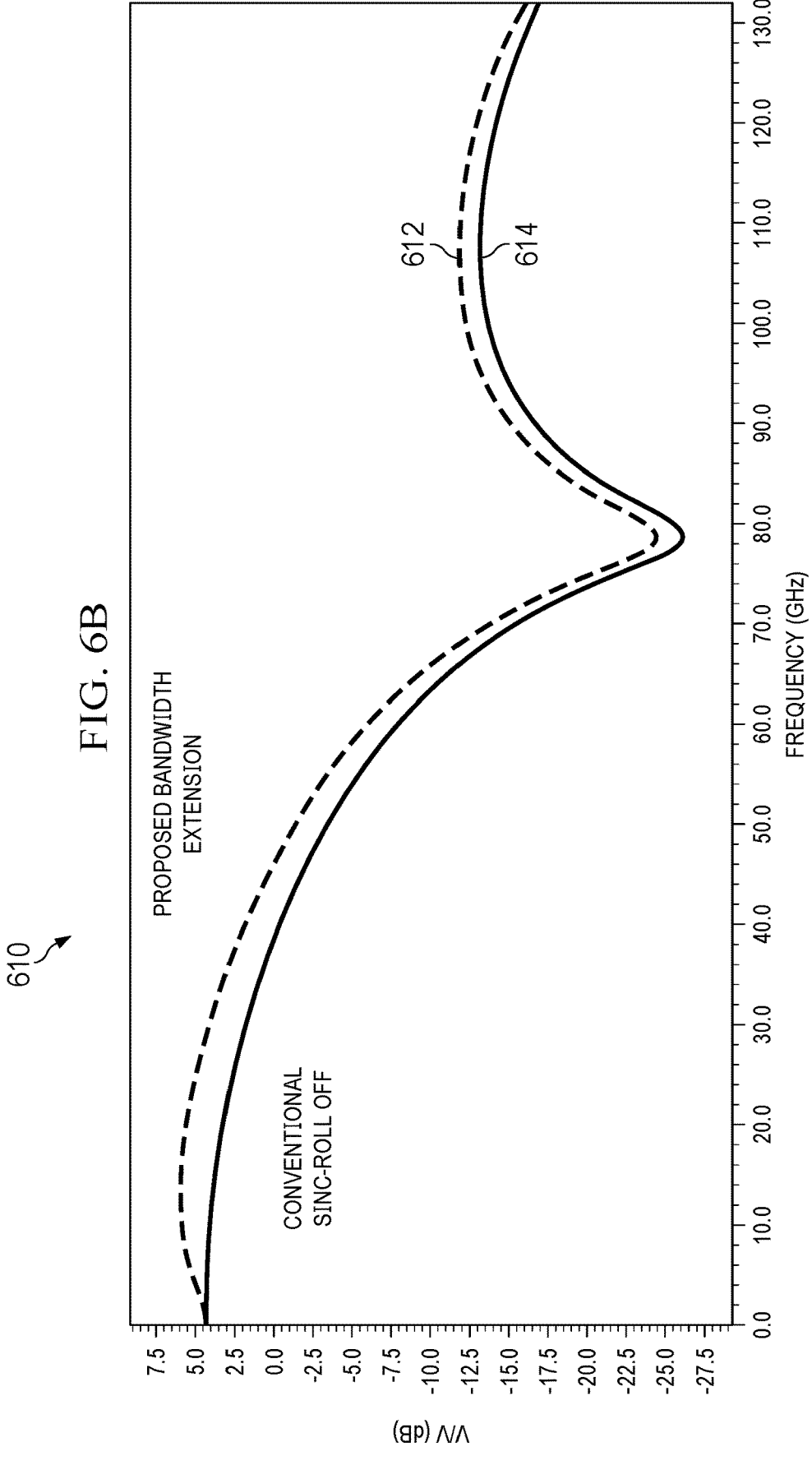
FIG. 6B is a bandwidth diagram described in conjunction with the integrating sampler of FIG. 6A.

FIG. 6B is an example bandwidth diagram 610 described in conjunction with the integrating sampler 600 of FIG. 6A. The bandwidth diagram 610 includes an example bandwidth plot 612 corresponding to the integrating sampler 600 and an example bandwidth plot 614 corresponding to the integrating sampler 400, 500. As shown in the bandwidth diagram 610, adding the high-pass filter 601 to the integrating sampler 600, the bandwidth at a 32 Gigahertz (GHz) sampling frequency results over a 2 decibel (dB) increase in bandwidth, from 1.25 dB of the bandwidth plot 614 to 3.65 dB of the bandwidth plot 612.

Figure 7:
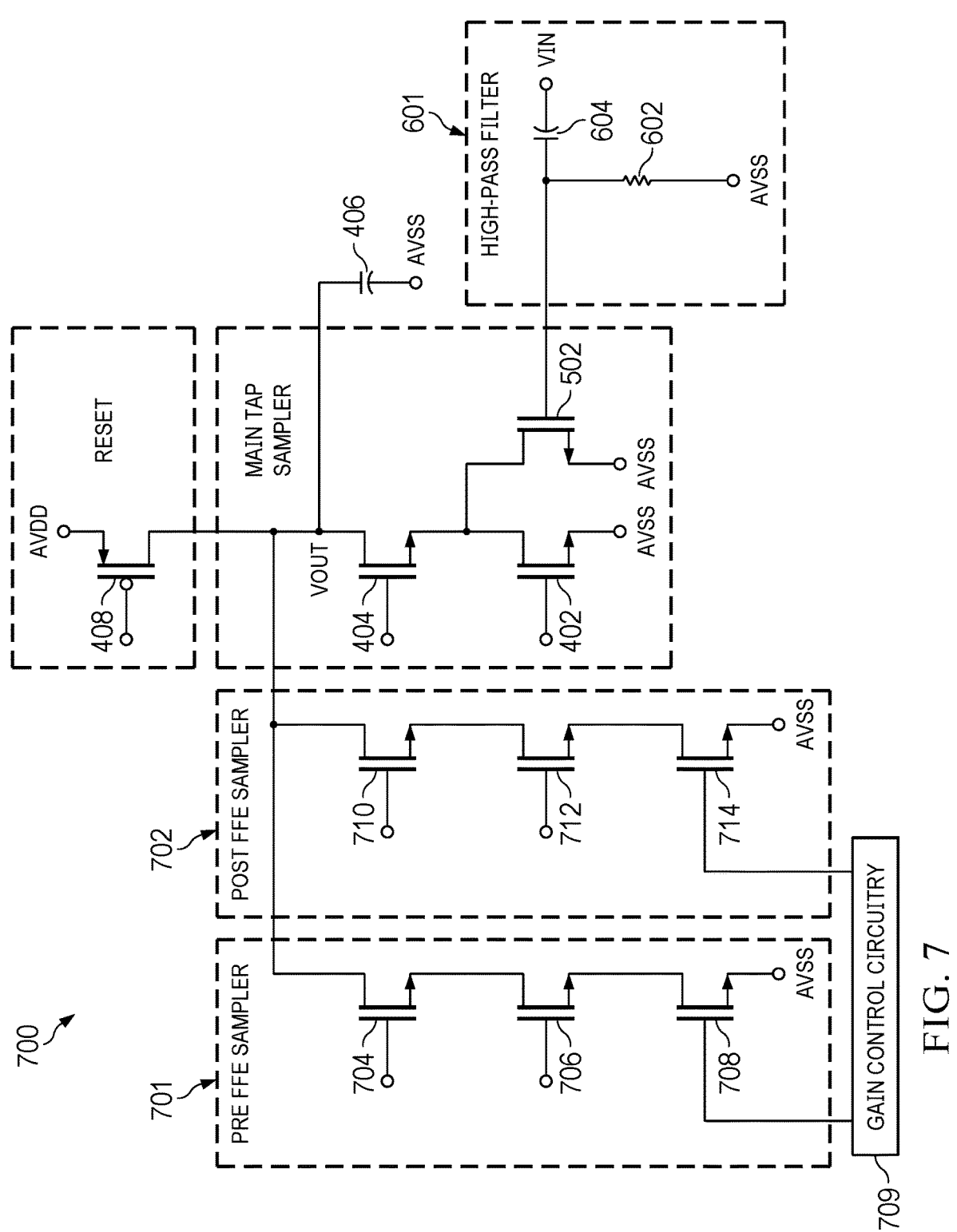
FIG. 7 is a circuit diagram of the example implementation of a feed forward equalizer by modifying the integrating sampler to include a post-feed forward equalizer sampler and a pre-feed forward equalizer sampler.

FIG. 7 is a circuit implementation of an example feed forward equalizer 700. The feed forward equalizer 700 can implement the integrating sampler 202 of FIG. 2. For example, the integrated samplers 400, 500, 600 of FIGS. 4A, 5 and 6A are modified to include a post-feed forward equalizer sampler and a pre-feedforward equalizer sampler, thereby converting the integrating sampler 202 into a feed forward equalizer. The example feed forward equalizer 700 includes the example transistor 402, the example transistors 404, 408, and the example capacitor 406 of FIG. 4A, the example transistor 502 of FIG. 5, and the example high-pass filter 601, the example resistor 602, the example capacitor 604 of FIG. 6A. The feed forward equalizer 700 further includes a first example sampler 701 and a second example sampler 702. The first sampler 701 includes example transistors 704, 708 and an example transistor 706. The second sampler 702 includes example transistors 710, 714 and an example transistor 712. Also, FIG. 7 includes example gain control circuitry 709. Although the feed forward equalizer 700 of FIG. 7 includes three samplers, there may be any number of pre or post samplers.

The first sampler 701 (also referred to as a FFE tap or a tap) of FIG. 7 is a pre-feed forward equalizer sampler or pre-feed forward equalizer circuit that samples the input signal prior to the main sampler corresponding to the transistor 402 and the transistor 404. Also, the first sampler 701 weights the sample. Because the first sampler 701 is coupled to the capacitor 406, the feed forward equalizer 700 adds the sample of the first sampler 701 with the sample from the main sampler via a charge on the capacitor 406, as further described below in conjunction with FIG. 9A.

The transistor 704 of FIG. 7 operates as a switch to allow the current from the transistor 706 to charge and/or discharge the capacitor 406 when the transistor 704 is enabled. The transistor 704 includes a control terminal, a first current terminal, and a second current terminal. The control terminal of the transistor 704 is coupled to the output of the clock generation circuitry 409 of FIG. 4. The first current terminal of the transistor 704 is coupled to the first terminal of the capacitor 406, the first current terminal of the transistor 710, the first current terminal of the transistor 404, and the second current terminal of the transistor 408. The second current terminal of the transistor 704 is coupled to the first current terminal of the transistor 706. When the transistor 704 is enabled, the current generated by the transistor 706 can be used to charge or discharge the capacitor 406 (e.g., depending on the direction of flow of the current). When the transistor 704 is disabled, the transistor 706 is decoupled from the capacitor 406 so that the current generated by the transistor 706 is not sued to charge or discharge the capacitor 406. As used herein, the transistor 704 being enabled causes the transistor 704 to act as a closed switch to allow current to flow to/from the first current terminal from/to the second current terminal. The transistor 704 being disabled causes the transistor 704 to act as an open switch to prevent current from flowing to/from the first current terminal from/to the second current terminal. The transistor 704 is enabled and disabled based on an output signal (e.g., a pulse signal) of the clock generation circuitry 409. Accordingly, the clock generation circuitry 409 controls when the transistor 704 is enabled and/or disabled, as further described below in conjunction with FIG. 9B. In some examples, the transistor 704 can be replaced with any type of switching component.

The example transistors 706 of FIG. 7 may include N transistors that convert the input voltage into a current when the corresponding transistors 708 are enabled. For example, the transistors 706 can be implemented by metal oxide semiconductor field effect transistors (MOSFET). The transistors 706 include a control terminal, a first current terminal, and a second current terminal. The control terminals of the transistors 706 are coupled to the output of the linear equalizer 200 of FIG. 2. The first current terminals of the transistors 706 are coupled to the second current terminal of the transistor 704. The second current terminals of the transistors 706 are coupled to respective first current terminals of the transistors 708. The example transistors 704 enable when the input signal at the control terminal of transistor 704 is a first voltage (e.g., a low voltage or logic '0') and disable when the input signal at the control terminal is a second voltage (e.g., a high voltage or logic '1'). If the transistor 704 is enabled and one or more of the transistors 708 are enabled, the corresponding transistors 706 allows current to flow to/from the first current terminals from/to the second current terminals as a function of the input voltage at the control terminals of the respective transistors 706. Although the transistors 706 of FIG. 7 are implemented by transistors, the transistors 706 can be implemented by any components that convert voltage to a current. An example implementation of N transistors to implement the transistors 706 of FIG. 7 is further described below in conjunction with FIG. 8.

The example transistors 708 of FIG. 7 may include N transistors that individually can be enabled to generate a gain or weight for the first sampler 701. The transistors 708 operate as switches. The gain control circuitry 709 controls the number of the transistors 708 that are enabled to define the coefficient of the gain for the sampler 701. For example, if only one of the transistors 708 is enabled, then only one of the transistors 706 has a path to ground, thereby decreasing the gain of the sampler 701. If all of the transistors 708 are enabled, then all of the transistors 706 have a path to ground, thereby increasing the gain of the sampler 701. The transistors 708 each include a control terminal, a first current terminal, and a second current terminal. The control terminals of the transistors 708 are coupled to the gain control circuitry 709 (also referred to as a gain control circuit). The first current terminals of the transistors 708 are coupled to the second current terminals of the respective transistors 706. The second current terminals of the transistors 708 are coupled to the common terminal (e.g., the AVSS terminal). The gain of the first sampler 701 is based on the number of the transistors 708 that are enabled (e.g., the higher the number of transistors 708, the higher the gain of the first sampler 701). The number of transistors 708 corresponds to the granularity between adjustments of the gain. For example, the gain of each transistor is an equal portion of the gain coefficient of all the transistor 708. Accordingly, if there are seven transistors 708 coupled in parallel, then there will be seven transistors 706 also coupled in parallel, as further described below in conjunction with FIG. 8. The gain control circuitry 709 monitors characteristics of the channel 122 (e.g., the temperature), to be able to determine an appropriate amount of gain to apply to the first sampler 701 and enables a number of the transistor 708 based on the determined amount of gain.

The second sampler 702 (also referred to as a FFE tap or a tap) of FIG. 7 is a post-feed forward equalizer sampler or post-feed forward equalizer circuit that samples the input signal after the main sampler corresponding to the transistor 402 and the transistor 404. Also, the second sampler 702 weights the sample. Because the second sampler 702 is coupled to the capacitor 406, the feed forward equalizer 700 adds the sample of the second sampler 702 with the sample from the main sampler via a charge on the capacitor 406, as further described below in conjunction with FIG. 9A.

The transistor 710 of FIG. 7 operates as a switch to allow the current from the transistor 712 to charge and/or discharge the capacitor 406 when the transistor 710 is enabled. The transistor 710 includes a control terminal, a first current terminal, and a second current terminal. The control terminal of the transistor 710 is coupled to the output of the clock generation circuitry 409 of FIG. 4. The first current terminal of the transistor 710 is coupled to the first terminal of the capacitor 406, the first current terminal of the transistor 704, the first current terminal of the transistor 404, and the second current terminal of the transistor 408. The second current terminal of the transistor 710 is coupled to the first current terminal of the transistor 712. When the transistor 710 is enabled, the current generated by the transistor 712 can be used to charge or discharge the capacitor 406 (e.g., depending on the direction of flow of the current). When the transistor 710 is disabled, the transistor 712 is decoupled from the capacitor 406 so that the current generated by the transistor 712 is not sued to charge or discharge the capacitor 406. As used herein, the transistor 710 being enabled causes the transistor 710 to act as a closed switch to allow current to flow to/from the first current terminal from/to the second current terminal. The transistor 710 being disabled causes the transistor 710 to act as an open switch to prevent current from flowing to/from the first current terminal from/to the second current terminal. The transistor 710 is enabled and disabled based on an output signal (e.g., a pulse signal) of the clock generation circuitry 409. Accordingly, the clock generation circuitry 409 controls when the transistor 710 is enabled and/or disabled, as further described below in conjunction with FIG. 9B. In some examples, the transistor 710 can be replaced with any type of switching component.

The example transistors 712 of FIG. 7 may include N transistors convert the input voltage into a current when the corresponding transistors 708 are enabled. For example, the transistor 712 can be implemented by metal oxide semiconductor field effect transistors (MOSFET). The transistors 712 include a control terminal, a first current terminal, and a second current terminal. The control terminals of the transistors 712 are coupled to the output of the linear equalizer 200 of FIG. 2. The first current terminals of the transistors 712 are coupled to the second current terminals of the transistor 710. The second current terminals of the transistors 712 are coupled to respective first current terminals of the transistors 714. The example transistors 712 enable when the input signal at the control terminal is a first voltage (e.g., a low voltage or logic '0') and disable when the input signal at the control terminal is a second voltage (e.g., a high voltage or logic '1'). If the transistor 710 is enabled and one or more of the transistors 714 are enabled, the corresponding transistors 712 allows current to flow to/from the first current terminals from/to the second current terminals as a function of the input voltage at the control terminals of the respective transistors 712. Although the transistors 712 of FIG. 7 are implemented by transistors, the transistors 712 can be implemented by any components that convert voltage to a current. An example implementation of N transistors to implement the transistors 712 of FIG. 7 is further described below in conjunction with FIG. 8.

The example transistors 714 of FIG. 7 are N multiple transistors that individually can be enabled to generate a gain or weight for the first sampler 702. The transistors 714 operate as switches. The gain control circuitry 709 controls the number of the transistors 714 that are enabled to define the coefficient of the gain for the sampler 702. For example, if only one of the transistors 714 is enabled, then only one of the transistors 712 has a path to ground, thereby decreasing the gain of the sampler 702. If all of the transistors 714 are enabled, then all of the transistors 712 have a path to ground, thereby increasing the gain of the sampler 702. The transistors 714 each include a control terminal, a first current terminal, and a second current terminal. The control terminals of the transistors 714 are coupled to the gain control circuitry 709. The first current terminals of the transistors 714 are coupled to the second current terminals of the respective transistors 712. The second current terminals of the transistors 714 are coupled to the common terminal (e.g., the AVSS terminal). The gain of the second sampler 702 is based on the number of the transistors 714 that are enabled (e.g., the higher the number of transistors 714, the higher the gain of the second sampler 702). The number of transistors 714 corresponds to the granularity between adjustments of the gain. For example, the gain of each transistor is an equal portion of the gain coefficient of all the transistor 714. Accordingly, if there are seven transistors 714 coupled in parallel, then there will be seven transistors 712 also coupled in parallel, as further described below in conjunction with FIG. 8. The gain control circuitry 709 monitors characteristics of the channel 122 (e.g., the temperature), to be able to determine an appropriate amount of gain to apply to the first sampler 702 and enables a number of the transistor 714 based on the determined amount of gain.

Figure 8:
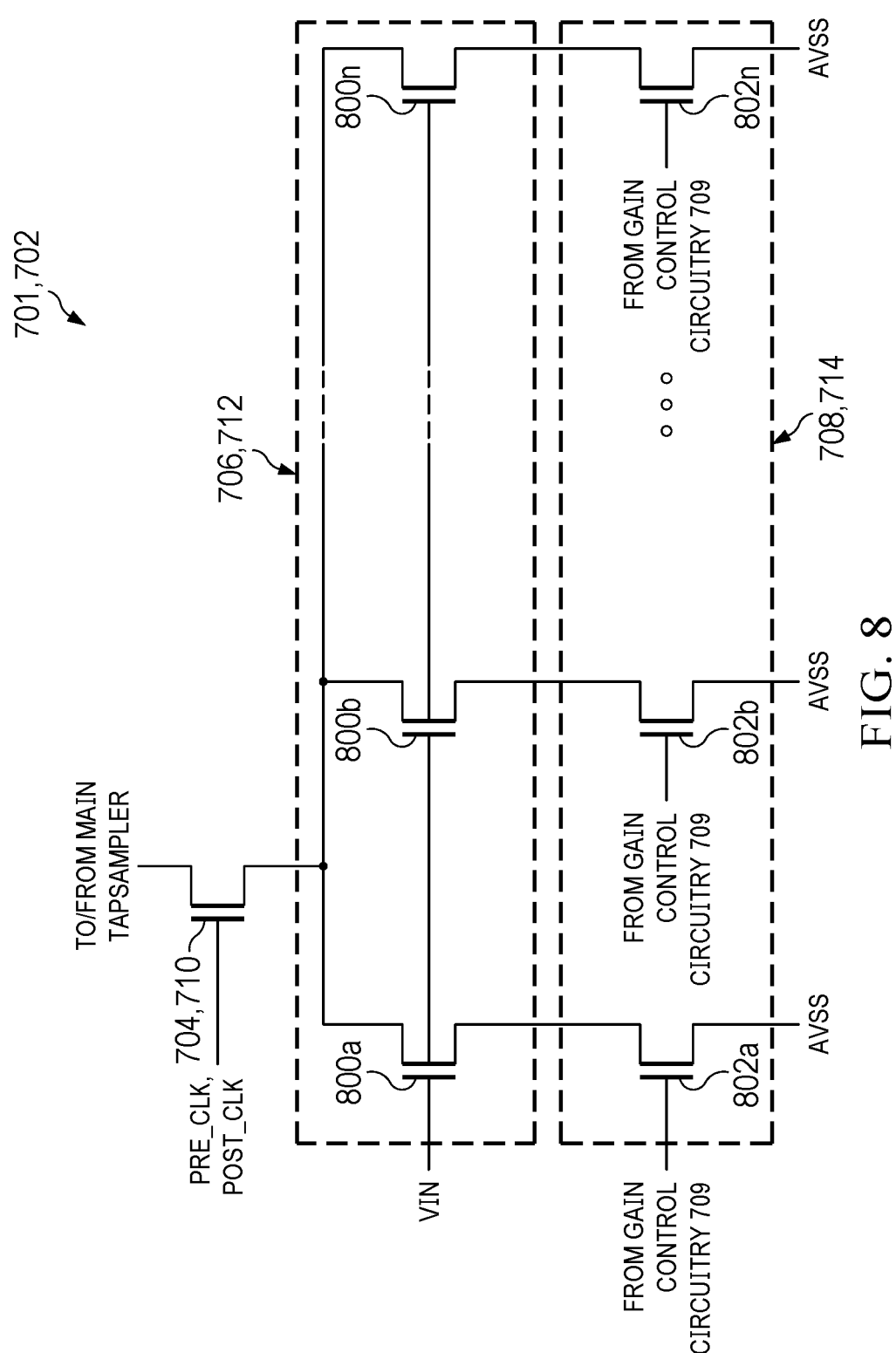
FIG. 8 illustrates a circuit diagram of the post-feed forward equalizer sampler or the pre-feed forward equalizer sampler of FIG. 7.

FIG. 8 is a circuit diagram of one of the pre-feed forward equalizer sampler 701 or the post-feed forward equalizer sampler 702 of FIG. 7. FIG. 8 includes the transistors 704, 706, 708, 710, 712, 714 of FIG. 7. The transistors 706, 712 include the transistors 800a-800n. The transistors 706, 712 include the transistors 802a-802n. Although the example circuit diagram of FIG. 8 includes N transistors 800a-n and N transistors 802a-n, there may be any number of transistors (e.g., one transistor 800a and one transistor 802a, two transistors 800a-800b and two transistors 802a-802b, etc.).

As shown in FIG. 8, the transistors 706 or the transistors 712 include N transistors. The number of transistors defines the granularity of the gain adjustments that can be implemented to adjust the coefficient associated with the sampler 701, 702. The transistors 800a-800n each include a control terminal, a first current terminal, and a second current terminal. The control terminals of the transistors 800a-800n are coupled to the control terminals of the training transistors 800a-800n and to the output of the linear equalizer 200 of FIG. 2. The first current terminals of the transistors 800a-800n are coupled to the second current terminal of the transistor 704, 710. The second current terminals of the transistors 800a-800n are coupled to the first current terminals of the respective transistors 802a-802n. Likewise, the transistors 708 or the transistors 714 include N transistors. The number of transistors defines the granularity of the gain adjustments that can be implemented to adjust the coefficient associated with the sampler 701, 702. The transistors 802a-802n each include a control terminal, a first current terminal, and a second current terminal. The control terminals of the transistors 802a-802n are coupled to the outputs of the gain control circuitry 709 of FIG. 7. In this manner, the gain control circuitry 709 can individually enable or disable any number of the transistors 802a-802n to control the gain of the sampler 701, 702. The first current terminals of the transistors 802a-802n are coupled to the respective second current terminals of the transistors 800a-800n. The second current terminals of the transistors 800a-800n are coupled to a common terminal (e.g., AVSS or ground).

Figure 9A:
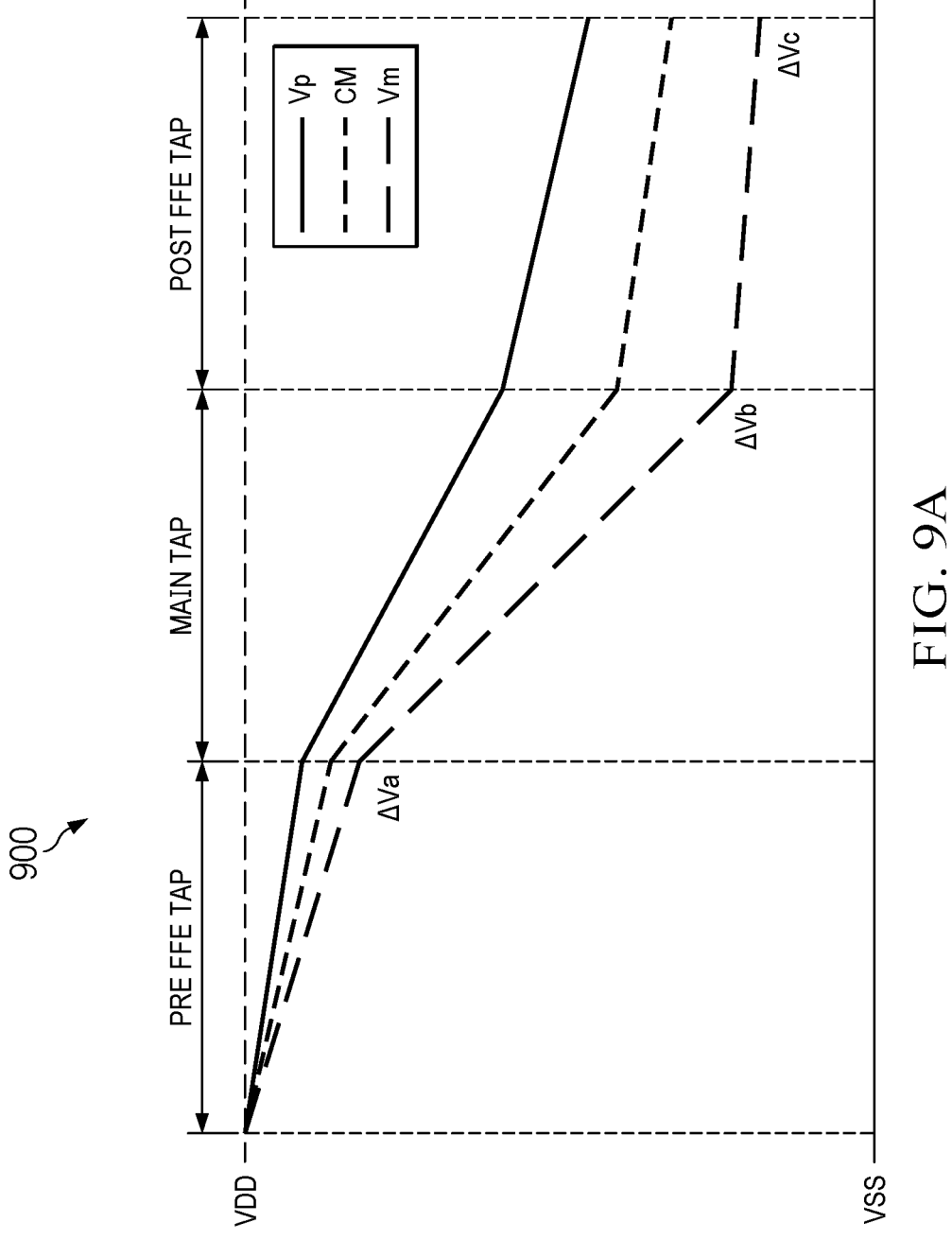
FIGS. 9A-9B include timing diagrams corresponding to the feed forward equalizer of FIG. 7.

FIG. 9A is an example timing diagram 900 illustrating an example result of the sampling of the feed forward equalizer 700 of FIG. 7. The timing diagram 900 illustrates the discharging of the capacitor 406 from the fully charged voltage of VDD to the final output sampling voltage that corresponds to the output signal of the feed forward equalizer 700. For example, during the "PRE FFE TAP" duration, the transistor 704 of the first sampler 701 is enabled, thereby allowing the current generated by the transistor 706 to discharge the capacitor 406. At the "MAIN TAP" duration, the transistor 704 of the first sampler 701 is disabled and the transistor 404 of the main sampler is enabled, thereby allowing the current generated by the transistor 402 to discharge the capacitor 406. At the "POST FFE TAP" duration, the transistor 404 of the main sampler is disabled and the transistor 710 of the second sampler 702 is enabled, thereby allowing the current generated by the transistor 712 to discharge the capacitor 406. After the "POST FEE TAP" duration, the transistor 710 of the second sampler 702 is disabled and the final output voltage stored in the capacitor 406 corresponds to a sum of the three samples. The processor unit 110, 120 processes the output voltage, which is a reconstruction of the obtained data signal. If there are additional tap circuitry (e.g., additional pre or post taps), the diagram 900 would include corresponding portions. The timing of the PRE FEE TAP, MAIN TAP, and POST FFE TAP is further described below in conjunction with FIG. 9B.

Figure 9B:
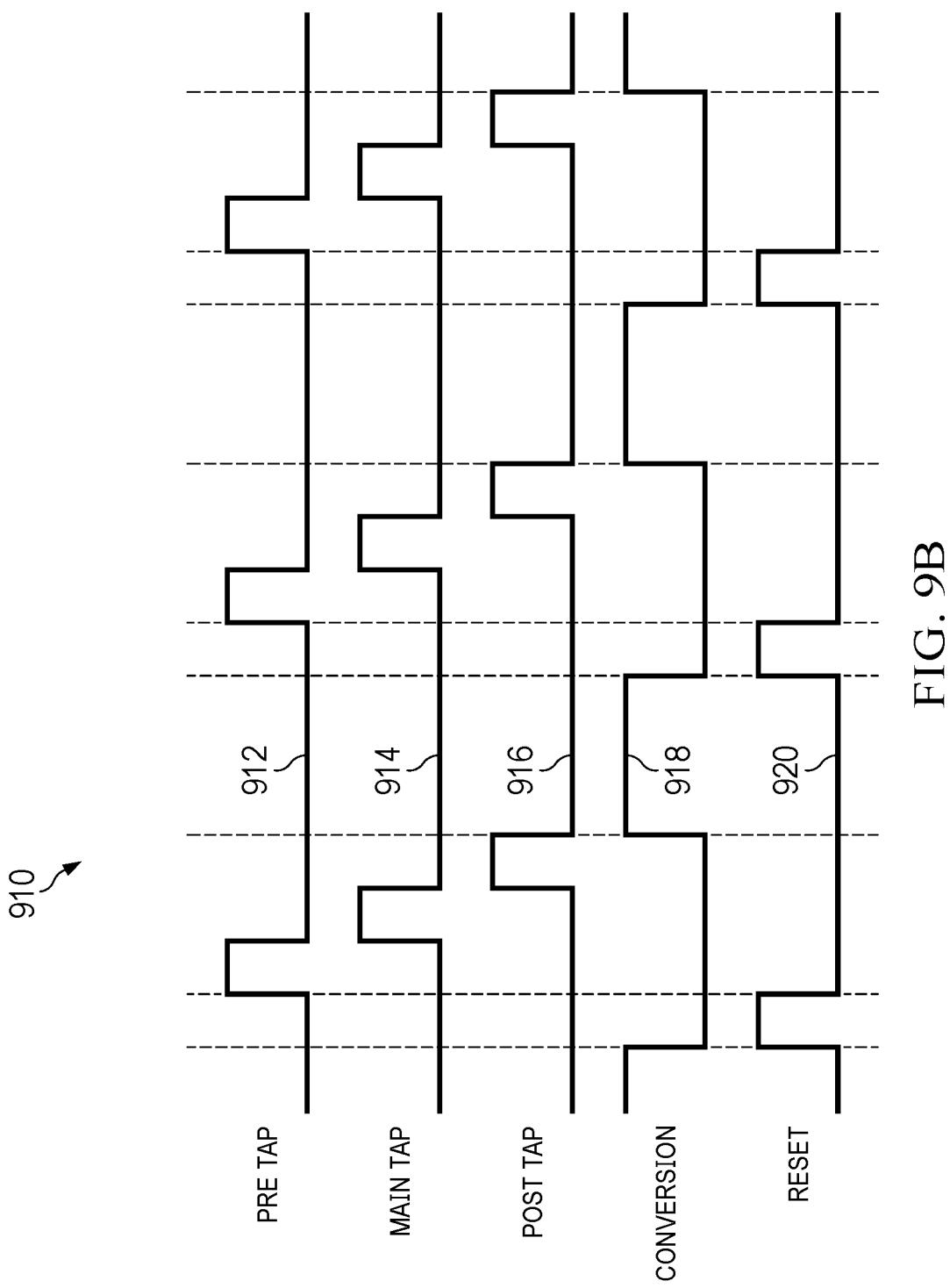

FIG. 9B is an example timing diagram 910 corresponding to the operation of the feed forward equalizer 700 of FIG. 7. The timing diagram 910 includes a pre tap plot 912, a main tap plot 914, a post tap plot 916, a conversion plot 918, and a reset plot 920. The pre tap plot 912 corresponds to the signal that is applied to the control terminal of the transistor 704. The main plot 914 corresponds to the signal that is applied to the control terminal of the transistor 404. The post plot 916 corresponds to the signal that is applied to the control terminal of the transistor 710. The reset plot 920 corresponds to the signal that is applied to the control terminal of the transistor 408.

In the example of FIG. 9B, when the reset signal 920 is a first voltage (e.g., a logic high voltage) and the tap signals 912, 914, 916 are a second voltage (e.g., a logic low voltage), the transistors 404, 704, 710 are disabled and the transistor 408 is enabled. Thus, the capacitor 406 can charge or discharge to a reset voltage (e.g., ground or the supply voltage) using the voltage from the AVDD terminal via the enabled transistor 408. Responsive to the reset signal 912 dropping to the second voltage and the pre tap signal 912 increasing to the first voltage, the transistor 704 becomes enabled and the transistor 408 becomes disabled. Thus, the capacitor 406 can charge or discharge using the current drawn by the transistor 706 (e.g., which is based on the input voltage) at a first point in time. Responsive to the pre tap signal 912 dropping to the second voltage and the main tap 914 increasing to the first voltage, the transistor 404 becomes enabled and the transistor 704 becomes disabled, thereby causing the current drawn by the transistor 402 to further charge or discharge the capacitor 406 based on the input signal at a second point in time. Responsive to the main tap signal 914 dropping to the second voltage and the post tap 916 increasing to the first voltage, the transistor 710 becomes enabled and the transistor 404 becomes disabled, thereby causing the current drawn by the transistor to further charge or discharge the capacitor 406 based on the input signal at a third point in time. Response to the post tap signal 916 dropping to the second voltage, the transistor 710 becomes disabled and the charge stored in the capacitor 406 is held at the output terminal so that the processor unit 110, 120 can process the output signal (e.g., corresponding to the conversion signal 414 being a logic high).

Figure 10:
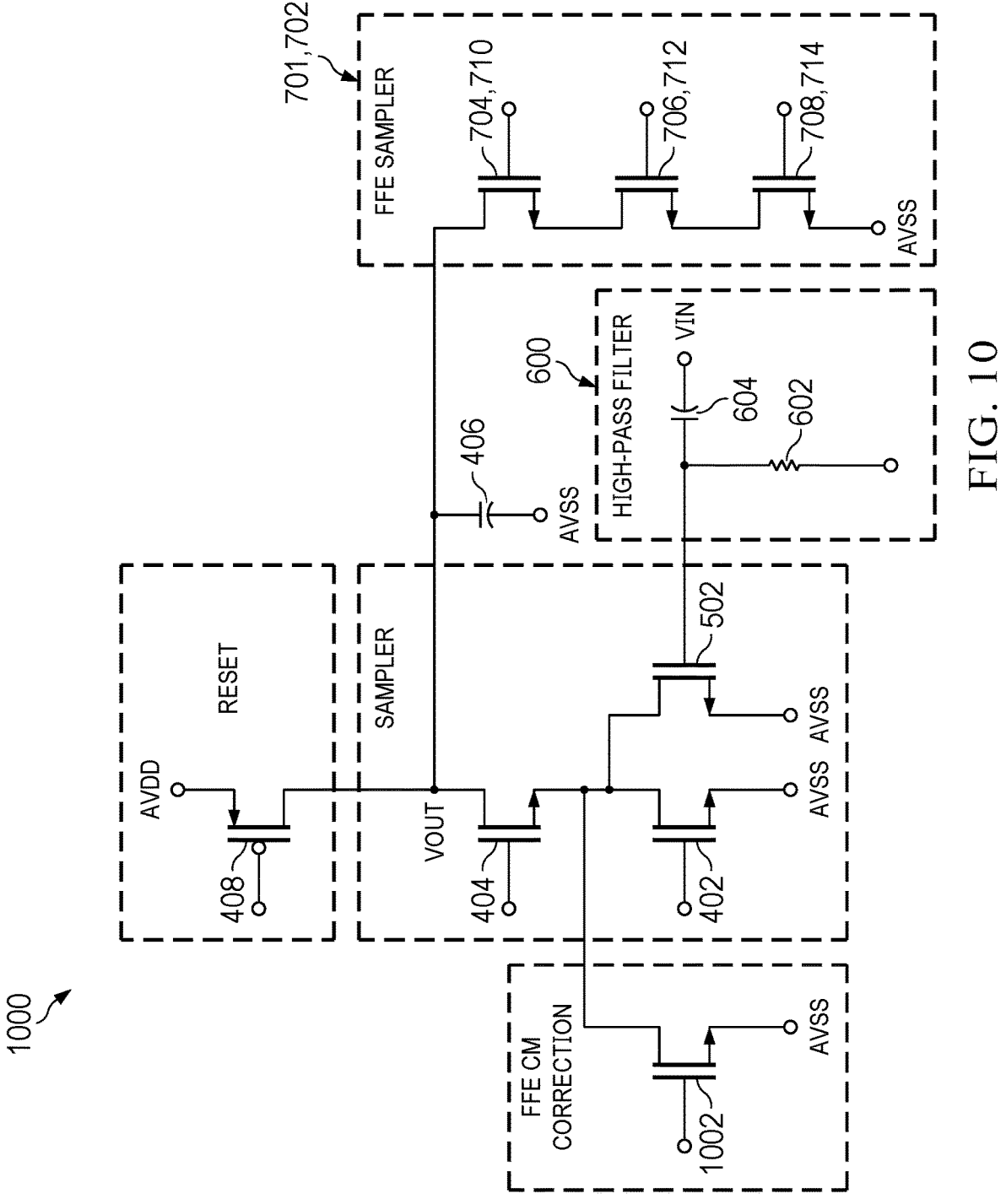
FIG. 10 is a circuit diagram of an example implementation of a feed forward equalizer including common mode adjustment circuitry for a pre or post feed forward equalizer sampler.

FIG. 10 is a circuit implementation of an example feed forward equalizer 1000. The feed forward equalizer 1000 can implement the integrating sampler 202 of FIG. 2. The example feed forward equalizer 1000 includes the example transistor 402, the example transistors 404, 408, and the example capacitor 406 of FIG. 4A, the example transistor 502 of FIG. 5, the example high-pass filter 601, the example resistor 602, the example capacitor 604 of FIG. 6A, and one of the samplers 701, 702 of FIG. 7 (including the transistors 704, 708, 710, 714 and the transistor 706, 712). Also, the feed forward equalizer 1000 includes the example transistors 1002. Although the feed forward equalizer 1000 of FIG. 10 includes two samplers (e.g., the main sampler and one of the first or second samplers 701, 702 of FIG. 7), there may be any number of pre or post samplers.

When the additional samplers 701, 702 are added to the feed forward equalizer 1000, extra common-mode current is drawn. The common mode (CM) droop is coefficient dependent and changes over time. Thus, there is no way to pre-adjust the CM current as the CM current can change at any time. However, the transistor 1002 of FIG. 10 can be added to the main sampler to compensate for the added comm mode current that are enabled or disabled based on the coefficient (e.g., gain) applied by the first and/or second sampler 701, 702, thereby compensating for the added common mode current based on the gain/coefficient applied by the first and second samplers 701, 702, as further described below.

The example transistors 1002 of FIG. 10 perform common mode correction for the first and/or second samplers 701, 702. The transistors 1002 are coupled together in parallel. The transistors 1002 each include a control terminal, a first current terminal, and a second current terminal. The control terminals of the transistors 1002 are coupled to the gain control circuitry 709 described above in conjunction with FIG. 7. The first current control terminals of the transistors 1002 are coupled to the second current terminal of the transistor 404, the first control terminal of the transistor 402, and the first control terminal of the transistor 501. The second current terminals of the transistors 1002 are coupled to a common terminal (e.g., the AVSS terminal). The number of the transistors 1002 is the same as the number of the transistors 708 or the transistors 714 to correct common mode voltage for the first and/or second samplers 701, 702. The control of the transistors 1002 is the opposite of the control of the transistors 708 or the transistors 714. For example, if all the transistors 708 are enabled while the transistor 704 is enabled, then none of the transistors 1002 are enabled. In another example, if one of three transistors 708 is enabled and two of the three transistors 708 are disabled, then two of the three transistors 1002 will be enabled and one of the three transistors 1002 will be disabled. Accordingly, the gain control circuitry 709 may output control signals to the transistors 1002 that are the opposite (e.g., '0' for '1' and '1' for '0') of the control signals that are output to the transistors 708, 714. In some examples, the gain control circuitry 709 outputs one set of signals and inverters can be used to convert the output into the opposite signals before being applied to the control terminals of the transistors 1002.

Example manners of implementing the integrating sampler 202 of FIG. 2 is illustrated in FIGS. 4A, 5, 6A, 7, and 10. However, one or more of the elements, processes and/or devices illustrated in FIG. 3 may be combined, divided, re-arranged, omitted, eliminated and/or implemented in any other way.

Further, the processing units 110, 120 and/or the clock generation circuitry 409 of FIGS. 1 and/or 4A may be implemented by hardware, software, firmware and/or any combination of hardware, software and/or firmware. As a result, for example, any of the processing units 110, 120 and/or the clock generation circuitry 409, of FIGS. 1 and/or 4A could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

When reading any of the apparatus or system claims of this patent to cover a purely software and/or firmware implementation, at least one of the processing units 110, 120 and/or the clock generation circuitry 409, of FIGS. 1 and/or 4A is/are hereby expressly defined to include a non-transitory computer readable storage device or storage disk such as a memory, a digital versatile disk (DVD), a compact disk (CD), a Blu-ray disk, etc., including the software and/or firmware. Further still, the processing units 110, 120 and/or the clock generation circuitry 409 of FIGS. 1 and/or 4A may include one or more elements, processes and/or devices in addition to, or instead of, those illustrated in FIGS. 1 and/or 4A, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather also includes selective communication at periodic intervals, scheduled intervals, aperiodic intervals, and/or one-time events.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

Descriptors "first," "second," "third," etc. are used herein when identifying multiple elements or components which may be referred to separately. Unless otherwise specified or known based on their context of use, such descriptors do not impute any meaning of priority, physical order, or arrangement in a list, or ordering in time but are merely used as labels for referring to multiple elements or components separately for ease of understanding the described examples. In some examples, the descriptor "first" may be used to refer to an element in the detailed description, while the same element may be referred to in a claim with a different descriptor such as "second" or "third." In such instances, such descriptors are used merely for ease of referencing multiple elements or components.

In the description and in the claims, the terms "including" and "having" and variants thereof are to be inclusive in a manner similar to the term "comprising" unless otherwise noted. Unless otherwise stated, "about," "approximately," or "substantially" preceding a value means +/−10 percent of the stated value. In another example, "about," "approximately," or "substantially" preceding a value means +/−5 percent of the stated value. In another example, "about," "approximately," or "substantially" preceding a value means +/−1 percent of the stated value.

The terms "couple" "coupled", "couples", and variants thereof, as used herein, may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A. Moreover, the terms "couple," "coupled", "couples", or variants thereof, includes an indirect or direct electrical or mechanical connection.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Although not all separately labeled in the FIGS. 1-9, components or elements of systems and circuits illustrated therein have one or more conductors or terminus that allow signals into and/or out of the components or elements. The conductors or terminus (or parts thereof) may be referred to herein as pins, pads, terminals (including input terminals, output terminals, reference terminals, and ground terminals, for instance), inputs, outputs, nodes, and interconnects.

As used herein, a "terminal" of a component, device, system, circuit, integrated circuit, or other electronic or semiconductor component, generally refers to a conductor such as a wire, trace, pin, pad, or other connector or interconnect that enables the component, device, system, etc., to electrically and/or mechanically connect to another component, device, system, etc. A terminal may be used, for instance, to receive or provide analog or digital electrical signals (or simply signals) or to electrically connect to a common or ground reference. Accordingly, an input terminal or input is used to receive a signal from another component, device, system, etc. An output terminal or output is used to provide a signal to another component, device, system, etc. Other terminals may be used to connect to a common, ground, or voltage reference, e.g., a reference terminal or ground terminal. A terminal of an IC or a PCB may also be referred to as a pin (a longitudinal conductor) or a pad (a planar conductor). A node refers to a point of connection or interconnection of two or more terminals. An example number of terminals and nodes may be shown. However, depending on a particular circuit or system topology, there may be more or fewer terminals and nodes. However, in some instances, "terminal," "node," "interconnect," "pad," and "pin" may be used interchangeably.

Example methods, apparatus, systems, and articles of manufacture corresponding to facilitate determination of leader and follower for a shared interface are described herein. Further examples and combinations thereof include the following: Example 1 includes a feed forward equalizer circuit comprising a transistor including a control terminal, a first current terminal, and a second current terminal, the control terminal of the transistor coupled to an output terminal of a linear equalizer, the second current terminal of the transistor coupled to a common terminal, a transistor including a control terminal, a first current terminal and a second current terminal, the control terminal of the transistor coupled to a clock circuit, the second current terminal of the transistor coupled to the first current terminal of the transistor, and a capacitor including a first terminal and a second terminal, the first terminal of the capacitor coupled to the first current terminal of the transistor, the second terminal of the capacitor coupled to the common terminal.

Example 2 includes the feed forward equalizer circuit of example 1, wherein the transistor is a first transistor, further including a second transistor including a control terminal, a first current terminal, and a second current terminal, the control terminal of the second transistor coupled to the clock circuit, the first current terminal of the second transistor coupled to a supply voltage terminal, and the second current terminal of the second transistor coupled to the first current terminal of the first transistor and the first terminal of the capacitor.

Example 3 includes the feed forward equalizer circuit of example 1, wherein the transistor is a first transistor, further including a second transistor including a control terminal, a first current terminal, and a second current terminal, the first current terminal of the second transistor coupled to the first current terminal of the transistor and the second current terminal of the first transistor, the second current terminal coupled to the common terminal.

Example 4 includes the feed forward equalizer circuit of example 3, further including a high-pass filter including an input terminal and an output terminal, the input terminal of the high-pass filter coupled to the output terminal of the linear equalizer, the output terminal of the high-pass filter coupled to the control terminal of the second transistor.

Example 5 includes the feed forward equalizer circuit of example 4, wherein the capacitor is a first capacitor, the high-pass filter including a second capacitor including a first terminal and a second terminal, the first terminal of the second capacitor coupled to the output terminal of the linear equalizer, the second terminal of the capacitor coupled to the control terminal of the second transistor, and a resistor including a first terminal and a second terminal, the first terminal of the resistor coupled to the first terminal of the second capacitor, the second terminal of the resistor coupled to a bias circuit.

Example 6 includes the feed forward equalizer circuit of example 1, further including a pre-feed forward equalizer circuit including a first input terminal, a second input terminal, a third input terminal and an output terminal, the first input terminal of the pre-feed forward equalizer circuit coupled to the clock circuit, the second input terminal of the pre-feed forward equalizer circuit coupled to the output terminal of the linear equalizer, and the output terminal of the pre-feed forward equalizer circuit coupled to the first current terminal of the transistor and the first terminal of the capacitor, and a post-feed forward equalizer circuit including a first input terminal, a second input terminal, a third input terminal and an output terminal, the first input terminal of the post-feed forward equalizer circuit coupled to the clock circuit, the second input terminal of the post-feed forward equalizer circuit coupled to the output terminal of the linear equalizer, and the output terminal of the post-feed forward equalizer circuit coupled to the first current terminal of the transistor, the third input terminal of the pre-feed forward equalizer circuit and the first terminal of the capacitor.

Example 7 includes the feed forward equalizer circuit of example 6, wherein the transistor is a first transistor and the transistor if a first transistor, the pre-feed forward equalizer circuit including a second transistor including a control terminal, a first current terminal, and a second current terminal, the control terminal of the second transistor coupled to the output terminal of the linear equalizer, a second transistor including a control terminal, a first current terminal and a second current terminal, the control terminal of the second transistor coupled to the clock circuit, the first current terminal of the second transistor coupled to the first current terminal of the first transistor, the first terminal of the capacitor, and the output terminal of the post-feed forward equalizer circuit, the second current terminal of the second transistor coupled to the first current terminal of the transistor, and a third transistor including a control terminal, a first current terminal, and a second current terminal, the control terminal of the third transistor coupled to a gain control circuit, the first current terminal of the third transistor coupled to the second current terminal of the second transistor, and the second current terminal of the third transistor coupled to the common terminal.

Example 8 includes the feed forward equalizer circuit of example 7, wherein the pre-feed forward equalizer circuit further includes a fourth transistor including a control terminal, a first current terminal, and a second current terminal, the control terminal of the fourth transistor coupled to the gain control circuit, the first current terminal of the fourth transistor coupled to the first current terminal of the third transistor, and the second current terminal of the second transistor.

Example 9 includes a receiver circuit comprising linear equalizer circuit including an input terminal and an output terminal, the input terminal structured to be coupled to a transmitter via a channel, and a feed forward equalizer circuit including a transistor including a control terminal, a first current terminal, and a second current terminal, the control terminal of the transistor coupled to the output terminal of the linear equalizer circuit, the second current terminal of the transistor coupled to a common terminal, a transistor including a control terminal, a first current terminal and a second current terminal, the control terminal of the transistor coupled to a clock circuit, the second current terminal of the transistor coupled to the first current terminal of the transistor, and a capacitor including a first terminal and a second terminal, the first terminal of the capacitor coupled to the first current terminal of the transistor, the second terminal of the capacitor coupled to the common terminal.

Example 10 includes the receiver circuit of example 9, wherein the transistor is a first transistor, the feed forward equalizer circuit further including a second transistor including a control terminal, a first current terminal, and a second current terminal, the control terminal of the second transistor coupled to the clock circuit, the first current terminal of the second transistor coupled to a supply voltage terminal, and the second current terminal of the second transistor coupled to the first current terminal of the first transistor and the first terminal of the capacitor.

Example 11 includes the receiver circuit of example 9, wherein the transistor is a first transistor, the feed forward equalizer circuit further including a second transistor including a control terminal, a first current terminal, and a second current terminal, the first current terminal of the second transistor coupled to the first current terminal of the transistor and the second current terminal of the first transistor, the second current terminal coupled to the common terminal.

Example 12 includes the receiver circuit of example 11, wherein the feed forward equalizer circuit further includes a high-pass filter including an input terminal and an output terminal, the input terminal of the high-pass filter coupled to the output terminal of the linear equalizer circuit, the output terminal of the high-pass filter coupled to the control terminal of the second transistor.

Example 13 includes the receiver circuit of example 12, wherein the capacitor is a first capacitor, the high-pass filter including a second capacitor including a first terminal and a second terminal, the first terminal of the second capacitor coupled to the output terminal of the linear equalizer circuit, the second terminal of the capacitor coupled to the control terminal of the second transistor, and a resistor including a first terminal and a second terminal, the first terminal of the resistor coupled to the first terminal of the second capacitor, the second terminal of the resistor coupled to a bias circuit.

Example 14 includes the receiver circuit of example 9, wherein the feed forward equalizer circuit further includes a pre-feed forward equalizer circuit including a first input terminal, a second input terminal, a third input terminal and an output terminal, the first input terminal of the pre-feed forward equalizer circuit coupled to the clock circuit, the second input terminal of the pre-feed forward equalizer circuit coupled to the output terminal of the linear equalizer circuit, and the output terminal of the pre-feed forward equalizer circuit coupled to the first current terminal of the transistor and the first terminal of the capacitor, and a post-feed forward equalizer circuit including a first input terminal, a second input terminal, a third input terminal and an output terminal, the first input terminal of the post-feed forward equalizer circuit coupled to the clock circuit, the second input terminal of the post-feed forward equalizer circuit coupled to the output terminal of the linear equalizer circuit, and the output terminal of the post-feed forward equalizer circuit coupled to the first current terminal of the transistor, the third input terminal of the pre-feed forward equalizer circuit and the first terminal of the capacitor.

Example 15 includes the receiver circuit of example 14, wherein the transistor is a first transistor and the transistor if a first transistor, the pre-feed forward equalizer circuit including a second transistor including a control terminal, a first current terminal, and a second current terminal, the control terminal of the second transistor coupled to the output terminal of the linear equalizer circuit, a second transistor including a control terminal, a first current terminal and a second current terminal, the control terminal of the second transistor coupled to the clock circuit, the first current terminal of the second transistor coupled to the first current terminal of the first transistor, the first terminal of the capacitor, and the output terminal of the post-feed forward equalizer circuit, the second current terminal of the second transistor coupled to the first current terminal of the transistor, and a third transistor including a control terminal, a first current terminal, and a second current terminal, the control terminal of the third transistor coupled to a gain control circuit, the first current terminal of the third transistor coupled to the second current terminal of the second transistor, and the second current terminal of the third transistor coupled to the common terminal.

Example 16 includes the receiver circuit of example 15, wherein the pre-feed forward equalizer circuit further includes a fourth transistor including a control terminal, a first current terminal, and a second current terminal, the control terminal of the fourth transistor coupled to the gain control circuit, the first current terminal of the fourth transistor coupled to the first current terminal of the third transistor, and the second current terminal of the second transistor.

Example 17 includes an apparatus comprising a transistor operable to convert an input voltage signal from a linear equalizer into a current, a first switch to enable and disable based on a first clock signal, a second switch to enable and disable based on a second clock signal, and a capacitor to charge based on the current when the first switch is enabled, and discharge when the second switch is enabled.

Example 18 includes the apparatus of example 17, further including a third switch connected in parallel with the transistor, the third switch to control a common mode current, and a high-pass filter coupled to a control terminal of the third switch, the high-pass filter to increase a bandwidth.

Example 19 includes the apparatus of example 17, wherein the transistor is operable to convert the input voltage signal at a first time, the current is a first current, and the transistor is a first transistor, further including a pre-feed forward equalizer circuit including a second transistor to convert the input voltage signal from the linear equalizer into a second current at a second time prior to the first time, and a third switch to enable and disable based on a third clock signal that pulses prior to the first clock signal, the capacitor to charge based on the second current when the third switch is enabled, the charge of the capacitor at the second time corresponding to a sum of the charge corresponding to the first current and the second current.

Example 20 includes the apparatus of example 19, wherein the pre-feed forward equalizer further includes one or more fourth switches, a gain of the pre-feed forward equalizer based on a number of the one or more fourth switches that are enabled while the third switch is enabled.

Modifications are possible in the described embodiments, and other embodiments are possible, within the scope of the claims.

What is claimed is:

1. A feed forward equalizer circuit comprising:
a first transistor including a control terminal, a first current terminal, and a second current terminal, the control terminal of the first transistor coupled to an output terminal of a linear equalizer, the second current terminal of the first transistor coupled to a common terminal;
a second transistor including a control terminal, a first current terminal and a second current terminal, the control terminal of the second transistor coupled to a clock circuit, the second current terminal of the second transistor coupled to the first current terminal of the first transistor; and
a capacitor including a first terminal and a second terminal, the first terminal of the capacitor coupled to the first current terminal of the second transistor, the second terminal of the capacitor coupled to the common terminal.

2. The feed forward equalizer circuit of claim 1, further including a third transistor including a control terminal, a first current terminal, and a second current terminal, the control terminal of the third transistor coupled to the clock circuit, the first current terminal of the third transistor coupled to a supply voltage terminal, and the second current terminal of the third transistor coupled to the first current terminal of the second transistor and the first terminal of the capacitor.

3. The feed forward equalizer circuit of claim 1, including a third transistor including a control terminal, a first current terminal, and a second current terminal, the first current terminal of the third transistor coupled to the first current terminal of the first transistor and the second current terminal of the second transistor, the second current terminal coupled to the common terminal.

4. The feed forward equalizer circuit of claim 3, further including a high-pass filter including an input terminal and an output terminal, the input terminal of the high-pass filter coupled to the output terminal of the linear equalizer, the output terminal of the high-pass filter coupled to the control terminal of the third transistor.

5. The feed forward equalizer circuit of claim 4, wherein the capacitor is a first capacitor, the high-pass filter including:
a second capacitor including a first terminal and a second terminal, the first terminal of the second capacitor coupled to the output terminal of the linear equalizer, the second terminal of the capacitor coupled to the control terminal of the third transistor; and
a resistor including a first terminal and a second terminal, the first terminal of the resistor coupled to the first terminal of the second capacitor, the second terminal of the resistor coupled to a bias circuit.

6. The feed forward equalizer circuit of claim 1, further including:
a pre-feed forward equalizer circuit including a first input terminal, a second input terminal, a third input terminal and an output terminal, the first input terminal of the pre-feed forward equalizer circuit coupled to the clock circuit, the second input terminal of the pre-feed forward equalizer circuit coupled to the output terminal of the linear equalizer, and the output terminal of the pre-feed forward equalizer circuit coupled to the first current terminal of the second transistor and the first terminal of the capacitor; and
a post-feed forward equalizer circuit including a first input terminal, a second input terminal, a third input terminal and an output terminal, the first input terminal of the post-feed forward equalizer circuit coupled to the clock circuit, the second input terminal of the post-feed forward equalizer circuit coupled to the output terminal of the linear equalizer, and the output terminal of the post-feed forward equalizer circuit coupled to the first current terminal of the second transistor, the third input terminal of the pre-feed forward equalizer circuit and the first terminal of the capacitor.

7. The feed forward equalizer circuit of claim 6, wherein the pre- feed forward equalizer circuit includes:
a third transistor including a control terminal, a first current terminal, and a second current terminal, the control terminal of the third transistor coupled to the output terminal of the linear equalizer;
a fourth transistor including a control terminal, a first current terminal and a second current terminal, the control terminal of the fourth transistor coupled to the clock circuit, the first current terminal of the fourth transistor coupled to the first current terminal of the first transistor, the first terminal of the capacitor, and the output terminal of the post-feed forward equalizer circuit, the second current terminal of the fourth transistor coupled to the first current terminal of the first transistor; and
a fifth transistor including a control terminal, a first current terminal, and a second current terminal, the control terminal of the fifth transistor coupled to a gain control circuit, the first current terminal of the fifth transistor coupled to the second current terminal of the fourth transistor, and the second current terminal of the fifth transistor coupled to the common terminal.

8. The feed forward equalizer circuit of claim 7, wherein the pre-feed forward equalizer circuit further includes:
a sixth transistor including a control terminal, a first current terminal, and a second current terminal, the control terminal of the sixth transistor coupled to the control terminal of the third transistor and the output terminal of the linear equalizer, the first current terminal of the sixth transistor coupled to the first current terminal of the third transistor and the second current terminal of the fourth transistor; and
a seventh transistor including a control terminal, a first current terminal, and a second current terminal, the control terminal of the seventh transistor coupled to the gain control circuit, the first current terminal of the seventh transistor coupled to the second current terminal of the sixth transistor, the second current terminal of the seventh transistor coupled to the common terminal, wherein a gain of the pre-feed forward equalizer circuit corresponds to a number of transistors that are enabled, the number of transistors including the fifth transistor and the seventh transistor.

9. A receiver circuit comprising:
linear equalizer circuit including an input terminal and an output terminal, the input terminal; and
a feed forward equalizer circuit including:
a first transistor including a control terminal, a first current terminal, and a second current terminal, the control terminal of the first transistor coupled to the output terminal of the linear equalizer circuit, the second current terminal of the first transistor coupled to a common terminal;

a second transistor including a control terminal, a first current terminal and a second current terminal, the control terminal of the second transistor coupled to a clock circuit, the second current terminal of the second transistor coupled to the first current terminal of the first transistor; and a capacitor including a first terminal and a second terminal, the first terminal of the capacitor coupled to the first current terminal of the second transistor, the second terminal of the capacitor coupled to the common terminal.

10. The receiver circuit of claim 9, wherein the feed forward equalizer circuit further includes a third transistor including a control terminal, a first current terminal, and a second current terminal, the control terminal of the third transistor coupled to the clock circuit, the first current terminal of the third transistor coupled to a supply voltage terminal, and the second current terminal of the third transistor coupled to the first current terminal of the second transistor and the first terminal of the capacitor.

11. The receiver circuit of claim 9, wherein the feed forward equalizer circuit further includes a third transistor including a control terminal, a first current terminal, and a second current terminal, the first current terminal of the third transistor coupled to the first current terminal of the first transistor and the second current terminal of the second transistor, the second current terminal coupled to the common terminal.

12. The receiver circuit of claim 11, wherein the feed forward equalizer circuit further includes a high-pass filter including an input terminal and an output terminal, the input terminal of the high-pass filter coupled to the output terminal of the linear equalizer circuit, the output terminal of the high-pass filter coupled to the control terminal of the third transistor.

13. The receiver circuit of claim 12, wherein the capacitor is a first capacitor, the high-pass filter including:

a second capacitor including a first terminal and a second terminal, the first terminal of the second capacitor coupled to the output terminal of the linear equalizer circuit, the second terminal of the capacitor coupled to the control terminal of the third transistor; and a resistor including a first terminal and a second terminal, the first terminal of the resistor coupled to the first terminal of the second capacitor, the second terminal of the resistor coupled to a bias circuit.

14. The receiver circuit of claim 9, wherein the feed forward equalizer circuit further includes:

a pre-feed forward equalizer circuit including a first input terminal, a second input terminal, a third input terminal and an output terminal, the first input terminal of the pre-feed forward equalizer circuit coupled to the clock circuit, the second input terminal of the pre-feed forward equalizer circuit coupled to the output terminal of the linear equalizer circuit, and the output terminal of the pre-feed forward equalizer circuit coupled to the first current terminal of the second transistor and the first terminal of the capacitor; and a post-feed forward equalizer circuit including a first input terminal, a second input terminal, a third input terminal and an output terminal, the first input terminal of the post-feed forward equalizer circuit coupled to the clock circuit, the second input terminal of the post-feed forward equalizer circuit coupled to the output terminal of the linear equalizer circuit, and the output terminal of the post-feed forward equalizer circuit coupled to the first current terminal of the second transistor, the third input terminal of the pre-feed forward equalizer circuit and the first terminal of the capacitor.

15. The receiver circuit of claim 14, wherein the pre-feed forward equalizer circuit includes:

a third transistor including a control terminal, a first current terminal, and a second current terminal, the control terminal of the third transistor coupled to the output terminal of the linear equalizer circuit;

a fourth transistor including a control terminal, a first current terminal and a second current terminal, the control terminal of the fourth transistor coupled to the clock circuit, the first current terminal of the fourth transistor coupled to the first current terminal of the second transistor, the first terminal of the capacitor, and the output terminal of the post-feed forward equalizer circuit, the second current terminal of the fourth transistor coupled to the first current terminal of the first transistor; and a fifth transistor including a control terminal, a first current terminal, and a second current terminal, the control terminal of the fifth transistor coupled to a gain control circuit, the first current terminal of the fifth transistor coupled to the second current terminal of the third transistor, and the second current terminal of the fifth transistor coupled to the common terminal.

16. The receiver circuit of claim 15, wherein the pre-feed forward equalizer circuit further includes:

a sixth transistor including a control terminal, a first current terminal, and a second current terminal, the control terminal of the sixth transistor coupled to the control terminal of the third transistor and the output terminal of the linear equalizer circuit, the first current terminal of the sixth transistor coupled to the first current terminal of the third transistor and the second current terminal of the fourth transistor; and a seventh transistor including a control terminal, a first current terminal, and a second current terminal, the control terminal of the seventh transistor coupled to the gain control circuit, the first current terminal of the seventh transistor coupled to the second current terminal of the sixth transistor, the second current terminal of the seventh transistor coupled to the common terminal, wherein a gain of the pre-feed forward equalizer circuit corresponds to a number of transistors that are enabled, the number of transistors including the fifth transistor and the seventh transistor.

17. The receiver circuit of claim 9, wherein the feed forward equalizer circuit further includes a third transistor having a control terminal, a first current terminal, and a second current terminal, the control terminal of the third transistor coupled to gain control circuitry, the first current terminal of the third transistor coupled to the first current terminal of the first transistor and the control terminal of the second transistor, the second current terminal coupled to the common terminal.

18. An apparatus comprising:

a transistor configured to convert an input voltage signal from a linear equalizer into a current;

a first switch configured to enable and disable based on a first clock signal;

a second switch configured to enable and disable based on a second clock signal; and a capacitor configured to:

charge based on the current when the first switch is enabled; and discharge when the second switch is enabled.

19. The apparatus of claim 18, further including:

a third switch coupled in parallel with the transistor, the third switch configured to control a common mode current; and a high-pass filter coupled to a control terminal of the third switch, the high-pass filter configured to increase a bandwidth.

20. The apparatus of claim 18, wherein the transistor is configured to convert the input voltage signal at a first time, wherein the current is a first current, and wherein the transistor is a first transistor, the apparatus further including a pre-feed forward equalizer circuit including:

a second transistor configured to convert the input voltage signal from the linear equalizer into a second current at a second time prior to the first time; and a third switch configured to enable and disable based on a third clock signal that pulses prior to the first clock signal, the capacitor configured to charge based on the second current when the third switch is enabled, the charge of the capacitor at the second time corresponding to a sum of the charge corresponding to the first current and the second current.

21. The feed forward equalizer circuit of claim 2, wherein the capacitor configured to:

charge when the second transistor is conducting; and discharge when the third transistor is enabled.

* * * * *